(12) United States Patent
Huber et al.

(10) Patent No.: US 7,231,839 B2
(45) Date of Patent: Jun. 19, 2007

(54) ELECTROOSMOTIC MICROPUMPS WITH APPLICATIONS TO FLUID DISPENSING AND FIELD SAMPLING

(75) Inventors: David Huber, Mountain View, CA (US); Shuhuai Yao, Stanford, CA (US); Juan G. Santiago, Freemont, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 91 days.

(21) Appl. No.: 10/638,732

(22) Filed: Aug. 11, 2003

(65) Prior Publication Data

US 2005/0034842 A1    Feb. 17, 2005

(51) Int. Cl.
*B01L 3/02* (2006.01)
*G01N 1/14* (2006.01)
*F04B 37/10* (2006.01)

(52) U.S. Cl. .................. 73/864.11; 73/864.22; 417/48; 417/49; 422/99; 422/100

(58) Field of Classification Search ............ 73/863.31, 73/863.32, 864–864.25; 422/99, 100; 417/48, 417/49
See application file for complete search history.

(56) References Cited

U.S. PATENT DOCUMENTS

| | | | |
|---|---|---|---|
| 3,923,426 A | 12/1975 | Theeuwes | 417/48 |
| 4,908,112 A | 3/1990 | Pace | 204/299 |
| 5,096,388 A | 3/1992 | Weinberg | 417/322 |
| 5,219,278 A | 6/1993 | Van Lintel | 417/413 |
| 5,336,062 A | 8/1994 | Richter | 417/413 |
| 5,759,014 A | 6/1998 | Van Lintel | 417/413.3 |
| 5,763,951 A | 6/1998 | Hamilton et al. | 257/714 |

(Continued)

OTHER PUBLICATIONS

"Modeling of Two-Phase Microchanel Heat Sinks for VLSI Chips," Koo, et al., Proceedings of the IEEE Micro Electro Mechanical Systems (MEMS); 2001; p. 422-426.

(Continued)

*Primary Examiner*—Hezron Williams
*Assistant Examiner*—David A. Rogers
(74) *Attorney, Agent, or Firm*—Womble Carlyle Sandridge & Rice, PLLC

(57) ABSTRACT

Apparatus and methods according to the present invention preferably utilize electroosmotic pumps in fluid handling and field sampling applications. The electroosmotic pumps used in these applications are capable of generating high pressure and flow without moving mechanical parts and the associated generation of unacceptable electrical and acoustic noise, as well as the associated reduction in reliability. Having multiple small flow channels in parallel provides both a high flow rate and high pressure in liquid handling. These electroosmotic pumps are fabricated with materials and structures that improve performance, efficiency, and reduce weight and manufacturing cost relative to presently available micropumps. These electroosmotic pumps also allow for recapture of evolved gases and deposited materials, which may provide for long-term closed-loop operation. Apparatus and methods according to the present invention also allow active regulation of the fluid handling and field sampling devices through electrical control of the flow through the pump. Electroosmotic pumping enables precise dispensing of samples to form genetic, proteomic, or small molecule arrays. A fluid sensor which can be optical, capacitive or other type of electrical sensor is integrated with the electroosmotic pump for measuring liquid levels in liquid drawing and dispensing operations.

65 Claims, 19 Drawing Sheets

U.S. PATENT DOCUMENTS

| | | | |
|---|---|---|---|
| 5,836,750 A | 11/1998 | Cabuz | 417/322 |
| 5,858,188 A | 1/1999 | Soane et al. | 204/454 |
| 5,880,071 A | 3/1999 | Parce et al. | 204/453 |
| 5,942,093 A | 8/1999 | Rakestraw et al. | 204/450 |
| 5,965,001 A | 10/1999 | Chow et al. | 204/600 |
| 6,007,309 A | 12/1999 | Hartley | 417/322 |
| 6,010,316 A | 1/2000 | Haller et al. | 417/322 |
| 6,013,164 A | 1/2000 | Paul et al. | 204/450 |
| 6,019,882 A | 2/2000 | Paul et al. | 204/450 |
| 6,046,059 A * | 4/2000 | Shen et al. | 438/3 |
| 6,054,034 A | 4/2000 | Soane et al. | 204/601 |
| 6,065,940 A * | 5/2000 | Fleischer et al. | 417/63 |
| 6,068,752 A | 5/2000 | Dubrow et al. | 204/604 |
| 6,090,251 A | 7/2000 | Sundberg et al. | 204/453 |
| 6,100,541 A | 8/2000 | Nagle et al. | 250/573 |
| 6,146,103 A | 11/2000 | Lee et al. | 417/50 |
| 6,171,067 B1 | 1/2001 | Parce | 417/48 |
| 6,174,675 B1 | 1/2001 | Chow et al. | 435/6 |
| 6,186,660 B1 | 2/2001 | Kopf-Sill et al. | 366/340 |
| 6,210,986 B1 | 4/2001 | Arnold et al. | 438/42 |
| 6,221,226 B1 | 4/2001 | Kopf-Sill | 204/602 |
| 6,227,809 B1 | 5/2001 | Forster et al. | 417/53 |
| 6,238,538 B1 | 5/2001 | Parce et al. | 204/600 |
| 6,252,129 B1 * | 6/2001 | Coffee | 602/42 |
| 6,277,257 B1 | 8/2001 | Paul et al. | 204/450 |
| 6,287,440 B1 | 9/2001 | Arnold et al. | 204/80.3 |
| 6,321,791 B1 | 11/2001 | Chow | 137/833 |
| 6,322,753 B1 | 11/2001 | Lindberg et al. | 422/192 |
| 6,490,920 B1 * | 12/2002 | Netzer | 73/304 C |
| 6,568,910 B1 * | 5/2003 | Parce | 417/40 |
| 6,576,896 B2 * | 6/2003 | Figeys et al. | 250/288 |
| 6,595,208 B1 * | 7/2003 | Coffee et al. | 128/203.12 |
| 6,689,373 B2 * | 2/2004 | Johnson et al. | 424/422 |
| 6,907,772 B2 * | 6/2005 | Kensey et al. | 73/54.04 |
| 6,932,893 B2 * | 8/2005 | Bech et al. | 204/403.01 |
| 2001/0027918 A1 * | 10/2001 | Parce et al. | 204/452 |
| 2001/0044155 A1 | 11/2001 | Paul et al. | 436/161 |
| 2001/0046703 A1 | 11/2001 | Bruns et al. | 435/303.1 |
| 2003/0064507 A1 * | 4/2003 | Gallagher et al. | 435/287.2 |
| 2004/0126890 A1 * | 7/2004 | Gjerde et al. | 436/53 |

OTHER PUBLICATIONS

"Silicon Micromachining and Micromachines," Esashi, Wear; Sep. 1, 1993; v. 168 No. 1-2, pp. 181-187.

"Flow characteristics of water through a microchannel between two parallel plates with electrokinetic effects", Mala et al., International Journal of Heat and Fluid Flow; Oct. 1997; v.18, No. 5, p. 489-496.

"Heat transfer and fluid flow in microchannels", Mala et al., International Journal of Heat and Mass Transfer; Sep. 1997; v.40, No. 13, p. 3079-3088.

"Integrated electroosmotic pumps and flow manifolds for total chemical analysis systems", Manz et al., Conference: 1991 International Conference on Solid-State Sensors and Actuators, Jun. 24-28, 1991, San Francisco, CA, USA.

"Electoosmotically induced hydraulic pumping with integrated electrodes on microfluidic devices", McKnight et al., Analytical Chemistry; Aug. 15, 2001; v.73, No. 16, p. 4045-4049.

"Partial electroosmotic pumping in complex capillary systems. Part 1: Principles and general theoretical approach", Morf et al., Sensors and Actuators, B: Chemical; Feb. 2001; v.72, No. 3, p. 266-272.

"Flow rate measurement via conductivity monitoring in microfluidic devices", Rainey et al., Proceedings of SPIE—The International Society for Optical Engineering; 2000; v.4177, p. 185-193.

"Acousto-and electroosmotic microfluidic controllers", Rife et al., Proceedings of SPIE—The International Society for Optical Engineering; 1998; v.3515, p. 125-135.

"Liquid flow and heat transfer in microchannels: A review", Rostami et al., Heat and Technology; 2000; v.18, No. 2, p. 59-68.

"Electroosmotic pumping and valveless control of fluid flow within a manifold of capillaries on a glass chip", Seiler, et al., Analytical Chemistry; Oct. 15, 1994; v.66, No. 20, p. 3485-3491.

"Microflow devices and systems", Shoji et al., Journal of Micromechanics and Microengineering; Dec. 1994; v.4, No. 4, p. 157-171.

"Electrokinetic dewatering and thickening. I. Introduction and historical review of electrokinetic applications", Sunderland, J Appi Electrochem; Sep. 1987; v.17, No. 5, p. 889-898.

"Modeling forced liquid convection in rectangular microchannels with electrokinetic effects", Yang et al., International Journal of Heat and Mass Transfer; Dec. 1998; v.41, No. 24, p. 4229-4249.

"Fabrication, Derivatization and Applications of Plastic Microfluidic Devices", Barker, et al., Proceedings of SPIE—The International Society for Optical Engineering, Nov. 2000, v.4205, p. 112-118.

"Fabrication and characterization of electrokinetic micro pumps", Zeng et al., Thermomechanical Phenomena in Electronic Systems -Proceedings of the Intersociety Conference; 2000; v.2, p. 31-36.

"Partial electroosmotic pumping in complex capillary systems. Part 2: Fabrication and application of a micro total analysis system suited for continuous volumetric nanotitrations", Guenat et al., Sensors and Actuators, B: Chemical; Feb. 2001; v.72, No. 3, p. 273-282.

"Electroosmotic pumping within a chemical sensor system integrated on silicon", Harrison et al., Conference: 1991 International Conference on Solid-State Sensors and Actuators, Jun. 24-28, 1991, San Francisco, CA, USA.

"Electroosmotic flow control in micro channels produced by scanning excimer laser ablation", Wagner et at, Proceedings of SPIE—The International Society for Optical Engineering; 2000; v.4088, p. 337-340.

"Liquid transport in rectangular microchannels by electroosmotic pumping", Arulanandam et al., Colloids and Surfaces A: Physicochemical and Engineering Aspects; 2000; v.161, No. 1, p. 89-102.

"Microflow devices for miniaturized chemical analysis systems", Buettgenbach et al., Proceedings of SPIE—The International Society for Optical Engineering; 1998; v.3539, p. 51-61.

"Electroosmosis: A reliable fluid propulsion system for flow injection analysis", Dasgupta et al., Analytical Chemistry; Jun. 1, 1994; v.66, No. 11, p. 1792-1798.

"Closed-Loop Electroosmotic Microchannel Cooling System for VLSI Circuits", Jiang, et at., printed in Journal of MEMS, Jan. 2002.

"Liquid Flows in Microchannels", Sharp, et al., CRC Press, 2002, Chapter 6, p. 6-1 to 6-38.

"Fabrication and characterization of electrokinetic micro pumps", Zeng, et al., 2000 Inter Society Conference on Thermal Phenomena, May 2000, p. 31-35.

"Electrokinetic Generation of High Pressures Using Porous Microstructures", Paul, et at., Micro-total analysis systems, 1998, Banff, Canada 1998, p. 49-52.

"Active control of electroosmotic flow in microchannels using light", Moorthy et al., Sensors and Actuators, B: Chemical; May 15, 2001; v.75, No. 3, p. 223-229.

"Irrotationality of uniform electroosmosis", Cummings et al., Proceedings of SPIE—International Society for Optical Engineering; 1999; v.3877, p. 180-189.

"Electroosmotic pumping and electrophoretic separations for miniaturized chemical analysis systems", Manz. et al., j. Micromech.. Microeng., 1994, p. 257-265.

Chen, et al., "Development of a Planar Electrokinetic Micropump," presented as ASME International Mechanical Engineering Congress and Exposition, Orlando, Florida, Nov. 7, 2000.

Laser, et al., High Frequency Actuation with Silicon Electroosmotic Micropumps, paper presented at 2002 Solid State Sensors and Actuators and Microsystems Workshop, Jun. 2002, Hilton Head, S.C.

* cited by examiner

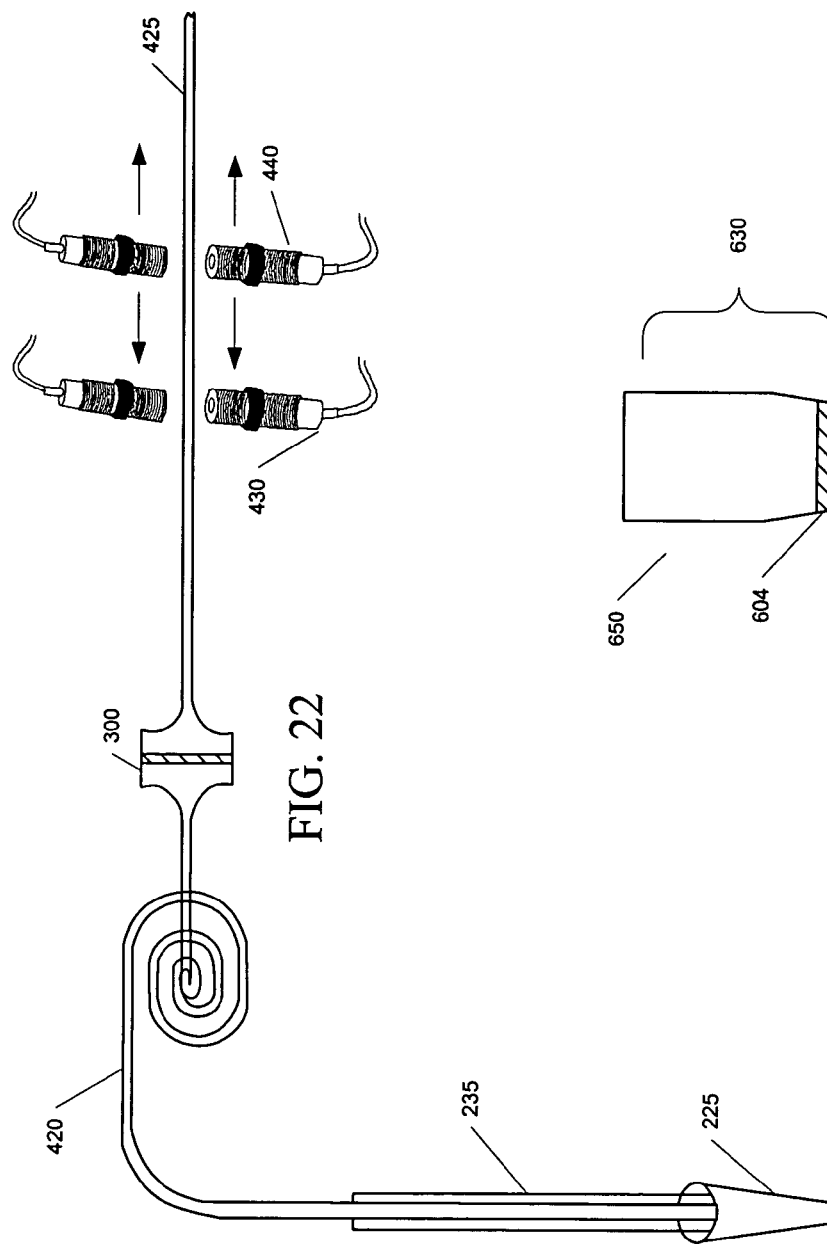
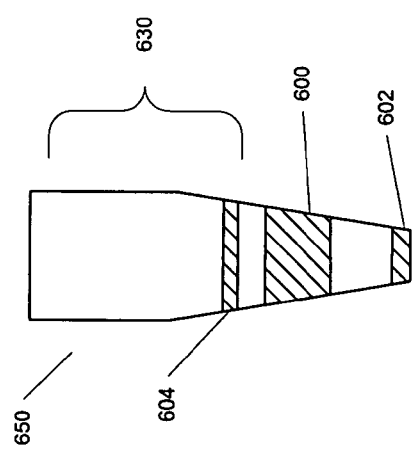
FIG. 22
FIG. 23

ELECTROOSMOTIC MICROPUMPS WITH APPLICATIONS TO FLUID DISPENSING AND FIELD SAMPLING

The inventions described herein were supported in part by DARPA/Air Force Contract F33615-99-C-1442.

CROSS REFERENCE TO RELATED APPLICATIONS

This application is related to, and contains common disclosure with, and commonly assigned patent applications "Electroosmotic Microchannel Cooling System" Ser. No. 10/053,859, filed Jan. 19, 2002, now U.S. Pat. No. 6,942,018; and "Control of Electrolysis Gases in Electroosmotic Pump Systems", Ser. No. 10/272,048, filed Oct. 16, 2002, now U.S. Pat. No. 7,134,486, which is a continuation-in-part of application Ser. No. 10/053,859. Each co-pending application is hereby incorporated by reference into this description as fully as if here represented in full.

FIELD OF THE INVENTION

This invention relates generally to fluid dispensing and field sampling. Specifically, this invention relates to drawing and dispensing fluids and filtering field samples using electroosmotic pumps.

BACKGROUND OF THE INVENTION

There has been extensive research into the development of micropumps. These research efforts include pumps based on oscillating piezoelectric membranes, peristaltic pumps, electrohydrodynamic pumps, and others. These pumps, to date, appear to be incapable of generating the pressure and/or flow in a compact and reliable device.

The phenomenon of electro-osmosis has been known since the work of F. F. Reuss in 1809. A simple description of this phenomenon is that liquid flow is induced on a region of net charge that develops at the liquid/wall interface known as the electric double layer. The charged fluid layer occurs as a result of a spontaneous chemical reaction between the surface and the electrolyte in the fluid that generates the charge separation at the liquid/solid interface called the "electric double layer". An externally imposed electric field forces the diffuse ions (charges) in the electric double layer (EDL) into motion. The diffuse ions drag the neutral bulk liquid. The magnitude of the force is proportional to the applied electric field, and the quantity of the charged species available in this region of net charge. Larger flow rates can be achieved for systems with large cross-sectional areas. Large pressure generation requires flow channels with small characteristic length scales. Porous structures and many small flow channels in parallel provide structure with high surface to volume ratio.

Miniature pumps based on the phenomenon of electro-osmosis (i.e., electroosmotic pumps) were originally developed by Theeuwes (U.S. Pat. No. 3,923,426), in which a porous ceramic structure was used to provide a multitude of micron-sized pathways with charged surface layers. Theeuwes describes the importance of selecting pumping structures which feature high porosity, high electroosmotic mobility for a given working fluid, small diameter pores, and discusses the possibility of the use of quartz or glass ceramics, possibly comprised of beads, and porous polymer matrices. The working fluid in the Theeuwes pump was suggested to have a high dielectric constant, low viscosity, and low electrical conductivity. Example liquids that the Theeuwes pump used include deionized water, ethyl-alcohol and alcohol-water mixtures, and many organic solutions.

Moreover, there exists a need for a highly reliable miniature pump that is capable of generating the high pressure (for example, pressure greater than 10 PSI) and/or high flow (for example, a flow rate greater than 0.01 ml/min) that are necessary for various applications in the biochemical assay space. Such a pump should overcome or address the shortcomings of the conventional pumps. EO pumps are compact devices and/because they have no moving parts are potentially very reliable.

SUMMARY OF THE INVENTION

Apparatus and methods according to the present invention preferably utilize electroosmotic pumps that are capable of generating high pressure and flow without moving mechanical parts and the associated generation of unacceptable electrical and acoustic noise, as well as the associated reduction in reliability. The pressure capacity of an electroosmotic pump is proportional to the squared inverse of the hydraulic diameter of flow channels.

Having multiple small flow channels in parallel provides both a high flow rate and high pressure. These electroosmotic pumps are preferably fabricated with materials and structures that improve performance, efficiency, and reduce size, weight, and manufacturing cost relative to presently available micropumps. Porous oxides, such as borosilicate glass frits, are ideally suited for EO pumps.

In one embodiment, a solid-state pipettor can be fabricated using an electroosmotic pump with a fluid sensor. The fluid sensor can be optical, capacitive or other type of electrical sensor for measuring liquid levels. For example, two conductively-coupled electrodes can be used to detect liquid level in a fluid reservoir column. The solid-state pipettor replaces manual and automatic pipettes that use mechanical actuators to draw and dispense liquid samples. The working fluid of the solid-state pipettor can be different than the liquid sample being driven into and out of the pipette, for example, through the use of an intervening membrane. Also, because of the high source pressure offered by electroosmotic pumps, the solid-state pipettor can be fit with high fluid resistance filters (either on the outstroke or the instroke of liquid or both) if needed for an application.

In another embodiment of the present invention, an electroosmotic pump can be used for a solid-state liquid sample dispensing application including robotic fluid handling for sample preparation, chemical synthesis and automated biochemical assays. This includes but is not limited to fluid dispensing of samples onto a genetic or proteomic array. In this application the electrical forcing of electroosmotic flow offers precise metering of liquid. For example, an electroosmotic pump fabricated using a 10 μm capillary packed with glass particles with a diameter on the order of 1 μm could be used to dispense sample droplets at the tip whose volume is on the order of a picoliter. Surface wetting forces would be used to release such drops from the device.

In another embodiment of the invention, the porous electroosmotic pumps described herein can be used with field sampling devices. Since the electroosmotic pump acts inherently as a filter, pumping and filtering applications can be combined in a small footprint. The electroosmotic pump draws a liquid sample and provides an initial filter for the field sample. As a personal reverse osmosis filtration system, a battery-driven electroosmotic pump drives liquid in the sample and provides pressure to drive solute through an osmotic membrane. This combination of filtering and pumping provides a pre-concentration method for uses such as a portable environmental monitoring system.

BRIEF DESCRIPTION OF THE DRAWINGS

These and other advantages and aspects of the present invention will become apparent and more readily appreciated from the following detailed description of the presently preferred exemplary embodiments of the invention taken in conjunction with the accompanying drawings, of which:

FIG. 22 illustrates another embodiment of an electroosmotic pump integrated with a pipettor and fluid level detectors.

FIG. 23 illustrates an integrated electroosmotic pump used as a filter or concentrator.

DETAILED DESCRIPTION OF THE INVENTION

Figure 1:
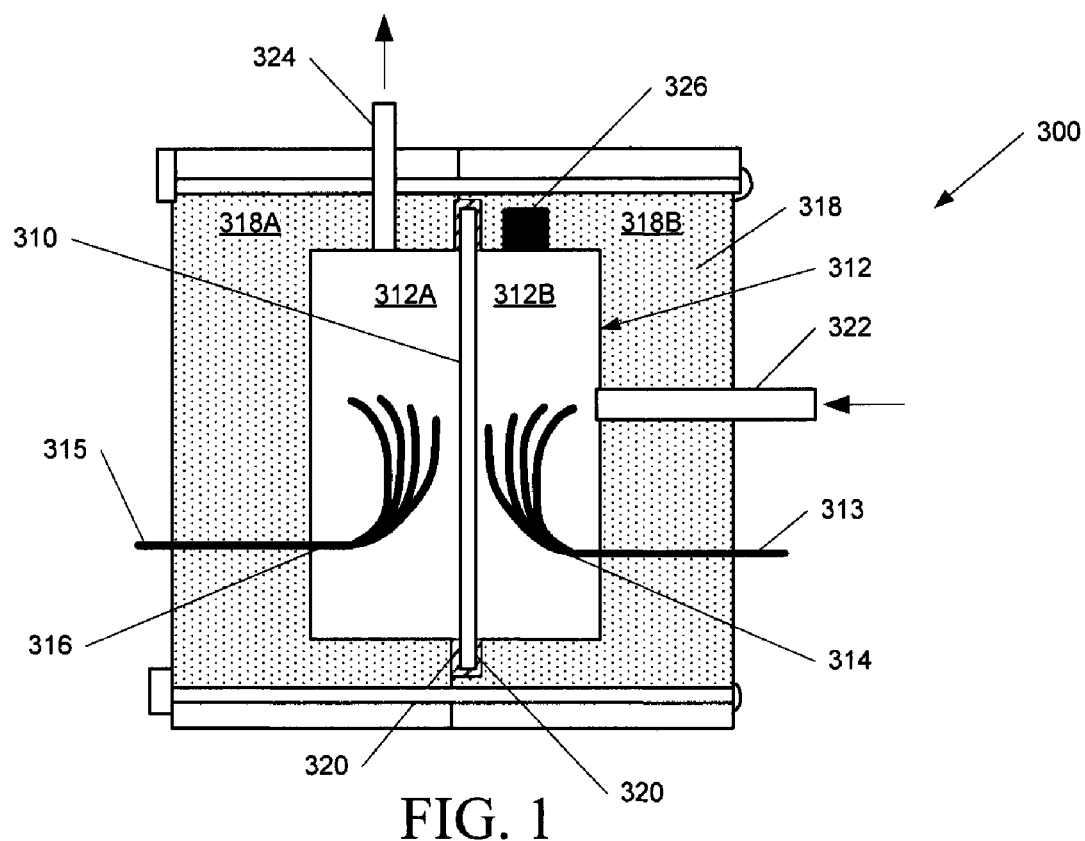
FIG. 1 illustrates an embodiment of an electroosmotic pump.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Various figures show different aspects of the system, and, where appropriate, reference numerals illustrating like components in different figures are labeled similarly. It is understood that various combinations of components other than those specifically shown are contemplated. Further, separate components are at times described with reference to a particular system embodiment, and while such description is accurate, it is understood that these components, with the variants described, are independently significant and have patentable features that are described separate and apart from the system in which they are described.

Before describing the specific applications of electroosmotic micropumps to fluid dispensing and field sampling, the designs and characteristics of electroosmotic micropumps suitable for use in these applications are described in detail. This description is drawn in large part from co-pending, commonly assigned patent applications having Ser. Nos. 10/053,859 and 10/272,048 and previously incorporated by reference herein.

There are many possible kinds of pumps that may be implemented and operated in the system described herein. Preferably, however, there is used a novel electroosmotic pump 300 (also referred to as "EO pump 300" or simply "pump 300") that is capable of producing high pressure and high flow rates at its output. Electroosmotic pumps 300 use electric fields to propel charges in the vicinity of a liquid-solid interface, and are generally tailored to have a very high ratio of surface to volume in the active pumping element. Pumps 300 can be made using a very wide variety of fabrication methods, because the basic electrochemistry of the charged layer and the resulting electroosmosis is known to occur for many material surfaces when brought into contact with water or aqueous solutions. The nature of the interaction between a particular solution and a particular surface will result in variations in the amount of charged solution that is available to be pulled by the applied electric field. As a result, the performance of the EO pump 300 is dependent on this surface interaction, and it may be useful to choose surfaces and solutions that create a strong electroosmotic pumping effect.

High pressure and flow rates for pumps 300 may result from, for example, using sintered microporous media, such as borosilicate frits, polymer frits, and packed beds of glass microparticles. Aerogels, glass fiber composites, nanostructured media, porous silica, microchannel plate structures, other porous ceramic materials, and many other materials which offer high surface/volume ratios and chemically active surfaces may be used to fabricate electroosmotic pumps 300. It is also possible to use lithographic methods to directly fabricate structures with high surface/volume ratios. Silicon microfabricated pumping structures can have the advantage of being integrated with other components and control electronics, all within a single module, as described further hereinafter.

A controller can be part of a system that includes an electroosmotic pump. The controller takes standard input voltages and converts them to the operating voltages required by the electroosmotic pump 300. The controller provides appropriate driving voltages to a power supply associated with the pump 300 to establish the appropriate current between the anode 314 and the cathode 316 of each electroosmotic pump 300 to cause the environment that will propel the liquid phase of the working fluid within the pump 300.

In addition to variations in the methods for fabrication of the materials and structures of the components descried above, including pumps 300, the present invention describes in another aspect unique operational methods.

One unavoidable aspect of the use of electroosmotic pumping methods is the electrochemistry of the interaction between the fluid and the electrodes. The exchange of charge at this interface causes electrolysis, and will lead to the decomposition of some of the constituents of the fluid. In the case of water, electrolysis results in the continuous formation of $H_2$ at one electrode and $O_2$ at the other electrode.

One aspect of this invention, therefore, as described further hereinafter, is the incorporation of a catalytic recombiner that consists of a catalyst composed of a hydrophobic platinum catalyst. $H_2$ and $O_2$ are recombined to form water at this catalyst, and the hydrophobic nature of this surface causes the water to bead up and fall from the catalyst surface and return to the fluid. Another method by which liquid is kept away from the catalyst surface is by use of the heat of reaction associated with the oxidation of hydrogen. While many different catalyst materials may work, it has been found that a hydrophobic platinum catalyst, described further herein, has worked best at the present time.

Figure 5:
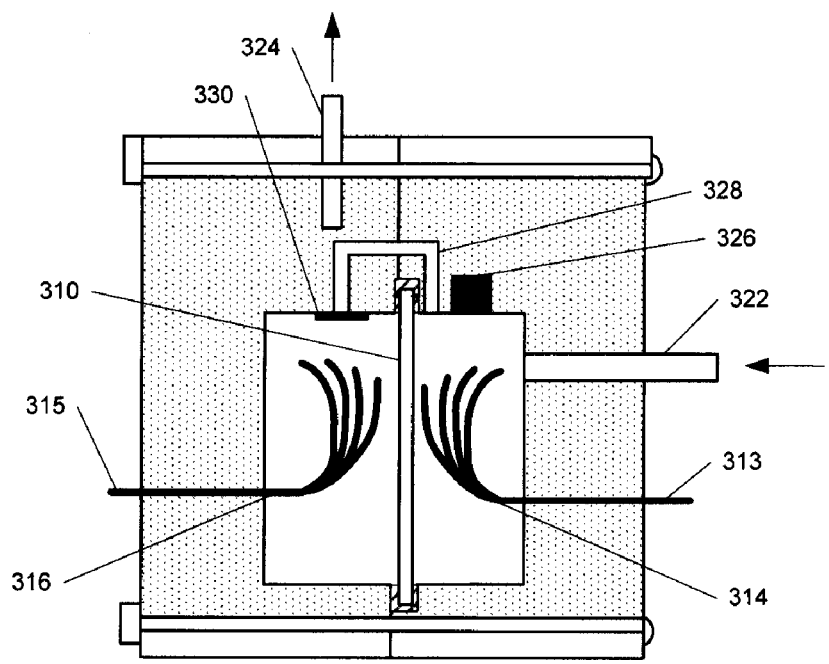

Other aspects of the invention described herein are the design of the inlet and outlet, the electrode design, and the position of the recombination chamber such that oxygen and hydrogen bubbles can be combined in a single, small volume chamber. FIG. 1 illustrates in further detail the design of the pump 300, which is formed by sealing a porous structure 310 between the cathode and anode halves 312A and 312B, respectively, of an enclosure that forms the pumping chamber 312. Anode 314 and cathode 316, via connections with respective electrodes 313 and 315 are inserted into the pumping chamber 312 through the walls 318 of the enclosure, making electrical contact with the working fluid inside the pump 300. The walls 318 can be made, for example, of an insulating material, such as glass acrylic, ceramic or $SiO_2$-coated silicon, and formed using a two piece structure containing walls 318A and 318B, which are joined, such as shown at the boundary of the porous structure 310, and sealed using seals 320, which may be, for example, an adhesive, a gasket, or by fusing or welding of the two pieces. Fluid flows from the inlet 322, is pulled through the porous structure 300 within the pumping chamber 312 by electroosmotic forces, and exits through the outlet 324. With reference to FIG. 5, oxygen generated at the anode 314 is trapped within the chamber portion 312B, and hydrogen generated at the cathode 316 passes through the loop 328 and returns to the pump 300, where it enters the catalytic recombiner 326 with the residual oxygen, and is recombined to form water and returned to the pumping chamber 312.

The use of electrolytes is critical in order for long-term performance of the pump 300 to be maintained (by stabilizing surface chemistry) and to reduce the voltage drop between the electrodes and the pump structure (i.e., the voltage drop associated with conducting ions from the electrode surface, through the intervening electrolyte, and to the inlet pores of the pumping structure).

Working fluid design and optimization strategies are significant in that they also affect the operation of the catalytic recombiner 326 illustrated in FIG. 1, which requires minimum partial pressures of hydrogen and oxygen in order to operate efficiently.

Fluid chemistries that can be used include, but are not limited to, deionized water (DI), aqueous buffer solutions, organic liquids (e.g., acetonitrile and methanol), and mixers of organics and buffers for the working fluid of the pump 300. Key issues in the optimization of the working fluid mixture include long-term pH control of working fluid (which directly affects pump surface charge density and therefore pump pressure and flow rate performance). High-flow rate performance of the pump may be achieved by increasing the conductivity of the fluid beyond what is available from DI water, for example by adding buffer to the water. In addition, additives in the aqueous solution can help to preserve the surface characteristics of the electrodes and the porous pumping structure. For example, increases in the conductivity of the working fluid has the negative effect of increasing the Joule heat dissipation of the pump 300, but also has the beneficial effect of decreasing the thickness of the layer of charged ions in the solution in the porous pumping structures, which increases the pressure and flow provided by the pump. In addition, increases in the conductivity of the fluid serve to reduce the potential drop from the electrodes to the surfaces of the porous pumping structure. This is important, because only the potential difference across the surfaces of the porous structure contribute to pumping action. Potential drop from the anode to one surface and from the other surface to the cathode are wasted.

With the above overview having been provided, as well as several advantages having been discussed, a further detailed description of the system, and various aspects and methods is set forth hereinafter.

The controller (not shown) referenced herein is understood to be an electronic circuit that takes input signals, which signals are transmitted along signal lines (not shown). The controller, based upon the input signals regulates the current through the pump 300 by applying signals to the power supply associated with the pump 300 along the signal lines to achieve the desired performance. The pump flow rate is strictly proportional to the applied voltage, so this control algorithm can be a simple proportional control algorithm, or may incorporate more sophisticated methodologies.

The preferred electroosmotic pump 300 in this system can be produced from a variety of materials and by a number of fabrication methods. Other pumps, however, such as electrostatically-actuated thin membrane pumps, piezoelectric pumps, electrohydrodynamic pumps, ultrasonic pumps and others may also be used and certain advantages of the present invention still would be obtained. Preferably, however, the pump is an electroosmotic pump 300, where the pump structure includes a liquid-filled chamber 312 with electrodes 314 and 316 on either side of a porous structure 310, as shown in FIG. 1 and mentioned above. When an electric potential difference between the anode 314 and the cathode 316, and thus between the opposite sides of the porous structure 310 exists, ions within the porous structure 310 are drawn from the side 312B to the side 312A, and the neighboring liquid is pulled through the structure 310 as well. The resulting flow and pressure difference causes the liquid flow through the entire system. In the embodiment shown in FIG. 1, a porous structure 310 in the form of a ceramic disk is sealed between the halves 312A and 312B of the chamber 312, and provisions for the fluid inlet 322 and outlet 324, anode 314, cathode 316, and catalytic recombiner 326 are shown. This particular pump embodiment may be easily assembled from inexpensive materials, and used to generate pressure in excess of 2 Atm and flow rates as high as 10 mL/min.

Figure 4:
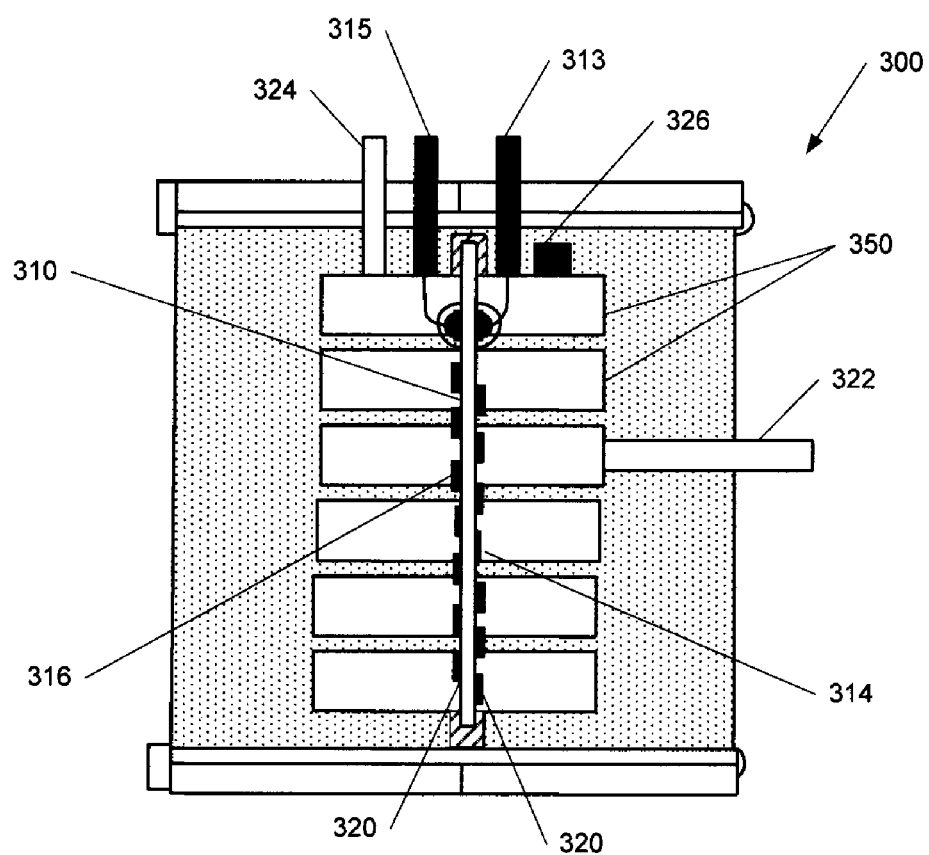
FIGS. 4–5 illustrate other embodiments of an electroosmotic pump.

In order for the preferred electroosmotic pump 300 to generate the pressure and flow rates desired, it is preferable that the pump 300 include the following components:

1. A porous structure 310 featuring a multitude of small-diameter pathways passing from one side to the other. The diameters of the pathways are typically smaller than 0.01 mm in diameter, and it is preferable if they are smaller than 0.0025 mm in diameter. The reason for this preference is that the smaller diameter channels result in a larger fraction of the fluid in proximity to the surfaces, and a larger charged fraction of the fluid, leading to a larger force on the total fluid for a particular potential difference. The thickness of the porous structure 310 is typically between 1 mm and 1 cm. Thinner structures result in an increased flow rate for a particular potential difference, but it is important to remember the resulting pressure exerts a force on this structure, and it can fail if it is too thin. The balance between the requirements of high flow rate and reliability leads to a preferred thickness for a ceramic structure of several mm. It is possible to improve this situation by providing support for the porous structure at several locations within the regions on opposite sides, as shown in FIG. 4.

When space is a design constraint or consideration, the dimensions of the chamber are chosen to minimize the size and mass of the pump, but to provide a robust enclosure. The enclosure must be fabricated from a material with insulating surfaces, so that there is no current from the cathode or anode into the chamber surfaces. For chambers made from acrylic, the overall dimensions are several cm, and the thickness of the walls is 1–3 mm. All of these dimensions may be reduced to allow pumps with overall dimensions of less than 1 cm, and even as small as 1–2 mm; these pumps feature chamber thicknesses near 1 mm, and down to 0.1 mm respectively.

The material of the porous structure 310 should have a high electroosmotic mobility with respect to the working fluid, and provide mechanical integrity necessary to withstand the high differential pressure that will occur.

2. A pair of electrodes, the anode 314 and the cathode 316 as shown, for applying the electric field across the porous structure 310. These electrodes 314, 316 are to be immersed into the fluid on opposite sides of the porous structure 310, and should withstand chemical interactions with the fluid, as well as the electrolysis that will occur when voltages are applied.

3. An inlet 322 and an outlet 324 for the fluid flow.

4. A means for capturing the evolved hydrogen and oxygen gases and recombining to replace the water lost to electrolysis, such as the catalytic recombiner 326 shown. An example of such a catalytic recombiner 326 is shown in FIG. 4, and consists of a small chamber filled with a platinum-coated mesh, or with ceramic pellets coated with platinum. The platinum surfaces serve as a substrate for an efficient reaction between $H_2$ and $O_2$ molecules generated elsewhere in the pump to recombine to form liquid water, after which this water passes back into the main chamber of the pump. This chamber can be positioned within the walls of the pump chamber 312, or can be attached to the outside of this chamber.

It is important for the recombiner chamber to provide a means for gas to enter from the pump chamber and for fluid to return.

5. A working fluid that features low viscosity, high resistivity, and high electroosmotic mobility with respect to the surfaces of the porous structure. This fluid should be composed of constituents that will not degrade during long term exposure to the other materials in the system, or during continuous electrolysis.

Embodiments that contain these elements of the pump 300 that are appropriate for operation of a system will now be described. These descriptions include details as to the formation of the entire pump structure, methods for attachment of electrodes to the surfaces of the porous structures, and specific examples of selected materials to form the porous structure 310.

Sintered Silica Pump Fabrication Process

One possible method for producing such pumping elements is to use a packed bed of silica particles as the porous structure 310. Various processes for fabricating the sintered particle pumping media have been developed and are well-known to those skilled in the are.

The first process is to centrifuge a silica-water slurry and decant off the water, dry the cake, slice into ~1 mm disk sections, and sinter. This works well for particles having a dimension of at least 1-micron.

Figure 2:
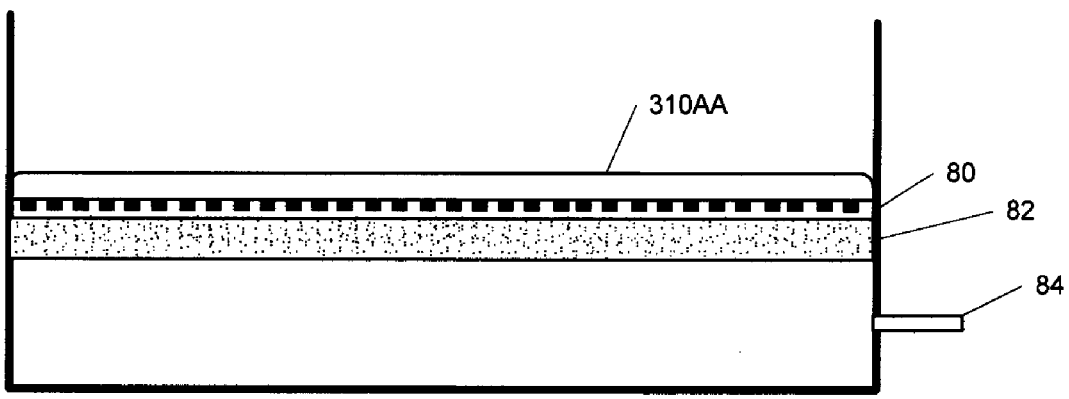
FIG. 2 illustrates an apparatus used in forming sintered disks.

The second process is to collect particles from an aqueous slurry by filtration, as shown in FIG. 2, using a filter support 82 and a membrane filter 80 in which a vacuum port 84 connects to a vacuum (not shown) to obtain a particle cake 310AA that will become the porous structure 310. The process works well for 1 micron particles, but the filter cake 310AA of 3-micron particles cannot be handled without crumbling like dry sand. Even if handled wet, the initial stages of sintering dry out the cake 310AA causing formation of cracks. This poor mechanical characteristic of the dry cake 310AA was solved by using a "binder" of silica gel. Frits were sintered at 1150° C. without evidence of cracking. Three variations of the particle-gel frit disk process are described below for 3-micron silica particles:

A precursor silica gel was produced from 1 part tetraethylorthosilicate (TEOS), 2 parts ethanol, 0.2 part water, and 0.01 part 10% HCl under vigorous stirring. After gas bubbles cease, the precursor solution was stirred in a closed container for 2 hr. Filter cake samples were then obtained in a variety of ways, including:

1. A filter cake of 3-micron particles was collected as shown schematically in FIG. 2, but before thoroughly drying, two aliquots of the precursor solution were flushed through the filter cake;

2. an aliquot of precursor solution was added to an aqueous slurry of 3-micron silica particles and filtered as shown in FIG. 2; and 3. An aliquot of precursor solution was added to an ethanol slurry of 3-micron silica particles and filtered as shown in FIG. 2.

The various samples were then air dried for three days, and then air-fired at 1150° C., with a ramp rate of 20° C./min, and a 30 min hold at 1150° C., and a cool down of 20° C./min.

The processing steps are representative, though they are not optimized, and variations that produce more dense disks that can be used as porous structures 310, or disks that feature higher pumping capacity may result.

A third method of collecting silica particles in a cake by electrophoretically compacting the silica particles from an aqueous slurry can also produce a suitably structured porous element 310. This process is similar to that described above and in FIG. 2, except that an electric potential is applied across the filter and support, and the electric field exerts a large force on the ions in the solutions, leading to forces which help pack the particles into a dense disk.

Key advantages of this general fabrication approach are controlled shape of the frit, controlled pore size, optimization of the flowrate and pressure, and simpler, more efficient surface chemistry. All of these advantages lead to more reliable operation of the EO pumps 300, and very inexpensive fabrication using inexpensive and widely-available materials Sintered Glass Frits Fabrication Process Another pump fabrication process is based on use of commercially-available ultrafine sintered glass frits, with the resulting sintered glass frit pump 300 being illustrated in FIGS. 3A and 3B. In this case, the ceramic disks are obtained in the correct size and shape. Preparation of the disks for the insertion on the pump 300 and assembly of the pumps 300 are described below:

1. 30-mm diameter, ultrafine glass frits are purchased from commercial suppliers, such as Robu, Inc. Acrylic blocks are machined to produce cavities 312A and 312B and contain walls 318 that form the chamber 312. These cavities 312A and 312B are nominally cylindrically shaped, 4-mm deep and 4 mm in diameter. At least one through-hole is required in the edge of each block to serve as either the fluid inlet 322 or outlet 324. Each through-hole is currently a 3 mm hole into which a machined barbed fitting is epoxied, and to which inlet and outlet tubings are attached. A 0.5-mm hole is also provided in each acrylic block for feeding through and epoxy-sealing the Pt wire lead to each electrode. The surfaces of each block that are to be epoxy-sealed are abraded with 180-grit abrasive to promote epoxy adhesion.

2. A 2×4 mm piece of mesh catalyst is inserted into the anode compartment, typically across the compartment from the inlet.

3. The Pt wire leads 342 are inserted into their respective holes in the anode and cathode compartments as the electrode frit is assembled between the two acrylic blocks, and the assembly clamped together with a C-clamp. Water resistant epoxy is used to seal 320 the joint between the acrylic and the ceramic disk. Since the acrylic is drawn into the pores of the ceramic disk, only a light epoxy coat is applied at first, then followed within an hour by a second heavier coat of epoxy to strengthen the bond between the acrylic and the ceramic disk.

4. The pump 300 is primed for operation by vacuum filling through the inlet port 322.

5. The pump 300 is operated by attaching a DC power supply, with the positive electrode (anode 314) at the inlet 322 side, and ground (or cathode 316) at the outlet 322 side of the pump 300.

6. To facilitate gas bubble advection into the flow and the collection of gas at the recombiner 326, the pump 300 is oriented so that buoyancy of the gas bubble favors the advection and collection.

Deposition of Electrode Metal on Pump Structure

This variation of the pump electrodes described above uses the deposition of electrode metal on the surface of the porous dielectric frit pump material. As-received frits are ground and polished with sequentially 120, 180, 240, 322, and 600 grit abrasive to obtain a porous ceramic structure 340. The objective is to remove gross surface irregularities from the frit manufacturing and provide as flat a surface on the interconnected grains as practical for the purpose of interconnecting "islands" of metallized glass grains.

1. Thin metal films are deposited as patterned electrodes 314 and 316 on opposite faces of the large surfaces of the ceramic disks. These films consist of e-beam evaporated layers of 40 nm Ti and 100 nm Pt. The Ti layer is a typical adhesion promoting film, and the thickness of the Pt inert electrode film is a compromise between stress, electrical conductivity, step coverage, and blockage of surface pores.

2. 10-mil Pt wires 342 are Ag-epoxied using epoxy 344 onto the Ti—Pt films to make electrical leads through the wall of the package. The Ag epoxy is protected from anodization by overcoating with clear water-resistant epoxy 346.

Anodized Alumina Pump Fabrication Process

This approach describes an alternative structural form of porous alumina, exemplified by Anopore filters. These filters are 70 microns thick and are made by anodizing aluminum sheets. This invention includes two improvements to the commercially-available anopore filters to make them suitable for EO pumps 300. The first is to use oxalic acid as the anodizing medium. The resultant mixed surface oxide-oxalate can be calcined to form only the oxide that will have a simpler surface chemical characteristic. The conversion of oxalates to oxides is a well-know ceramic technology. The second improvement is to anodize substantially thicker aluminum layers to increase the pore length to several hundred microns, thus increasing the hydraulic resistance and maximum pressure the pump 300 can generate. The thicker porous films will also be mechanically much stronger than the existing filter structures.

Key advantages of all the above-mentioned approaches over existing approaches for the formation of porous structures that could be used as porous structure 310 include formation of an optimum flow structure of parallel pores which reduces the "tortuosity", formation of pumping structures are very flat, ensuring that deposited metal film electrodes will be interconnected, and low cost since 25-mm diameter filters retail for $1 after a polypropylene supporting structure has been (thermally) bonded.

FIG. 4 shows a modification pump 300 that uses porous frits as described above. In this modification, however, pump 300 uses a set of support structures 350 to provide mechanical support to the porous pumping structure. One of the important characteristics of the pump is that the force generated on the fluid is proportional to the potential across the pump and to the density of the charged layers on the surfaces within the porous structure. The flow rate through the pump is increased if the thickness of the porous medium can be reduced, but this medium is required to withstand the pressure difference. A large area, thin structure would, in general, fail under high pressure differences. To address this, as shown in FIG. 4, support structures 350 can be fabricated that extend from one half 312A of the enclosure that forms the pumping chamber 312 to the other half 312B of the enclosure. These support structures 350 can be shaped as pillars or beams extending across one dimension of the structure, and provide only points of mechanical support without substantially impeding the flow of fluid to and through the porous pumping structure 310.

The electroosmotic pump 300 described herein offers unique capabilities for the generation of large volume flow and large pressure within a compact package that consumes little power and has no moving parts. However, this pump 300 includes some complexities that must be managed. For example, the application of potential and current to the solution in the pump 300 necessarily causes electrolysis, and the gas generated in this process must be managed. One option is to simply let the gas escape from the system along with the pumped fluid. In such a system, the fluid is gradually depleted, and this can be tolerated for systems that are only used some of the time. Otherwise, the fluids must be replenished. A second complexity is the management and control of the flow of electrolysis gas bubbles and gas slugs in the liquid flow lines. To this end, we have devised the application of gas permeable membranes which can be used to separate electrolytic gases and redirect them to the recombination chamber. A third complexity is the optimization of working liquid as the pump characteristics are a function of the type of ions used, ion concentration, pH of the solution, and temperature.

Figure 3A:
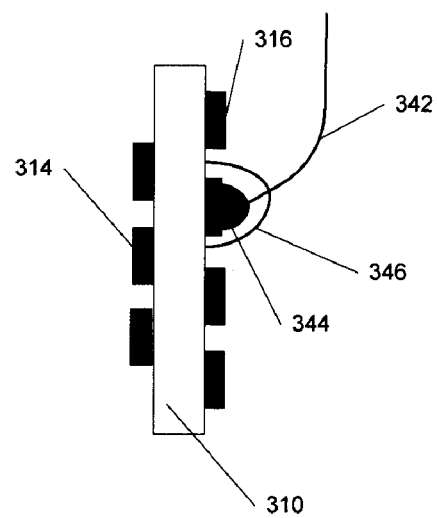
FIGS. 3A and 3B illustrate an electroosmotic pump using a sintered glass frit porous structure according to an embodiment of the present invention.
Figure 3B:
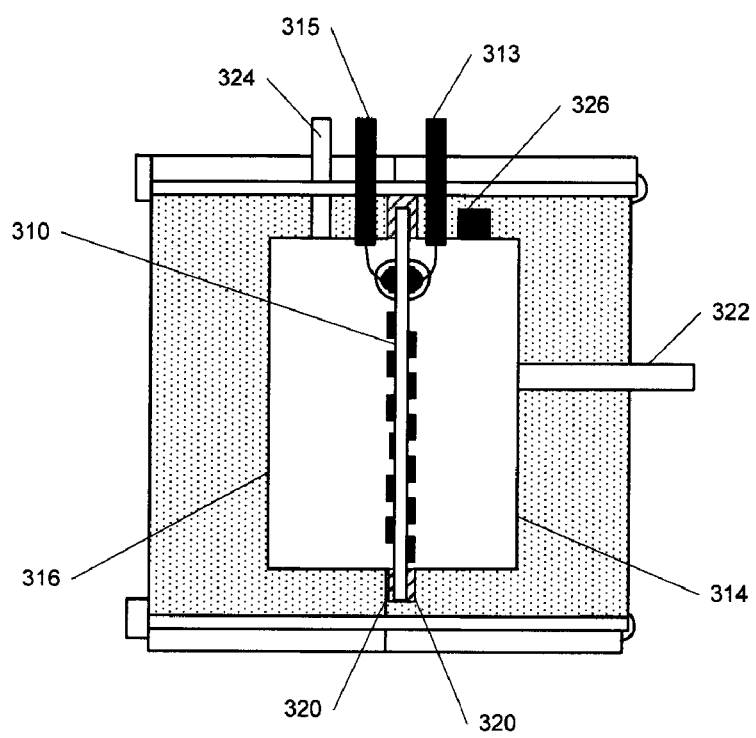

In general, however, it is preferable to recapture the gas, and recombine it to recover the fluid. FIG. 3A-3B illustrate a system in which hydrogen gas from the cathode 314 passes through the outlet 324, through the loop and arrives at the anode 316. Oxygen generated at the anode 316 is combined with the hydrogen on the surfaces of a catalytic recombiner 326. Rather than let the hydrogen gas pass through the loop (where gas bubbles can cause pressure and flow variations), it is advantageous to capture this gas in the cathode chamber 312a, and return it directly to the anode chamber 312b.

FIG. 5 illustrates an embodiment of the pump 300 that has been modified to provide for gas delivery to the anode chamber 312b. A channel 328 in the support structure is formed to allow this gas to pass, and a semi-permeable membrane 330 is positioned so as to block the flow of liquid while allowing the flow of gas. In practice, there are many possible geometric arrangements of the channel 328 and the membrane 330 that accomplish the movement of the gas and the opportunity for recombination. FIG. 5 shows a pathway up and around the porous pumping structure with a single porous membrane 330 at the cathode chamber 312a. It is possible to position this membrane 328 at the anode chamber 312b, in the channel 328, such as at the joint between the two halves of the enclosure, or elsewhere.

Figure 6:
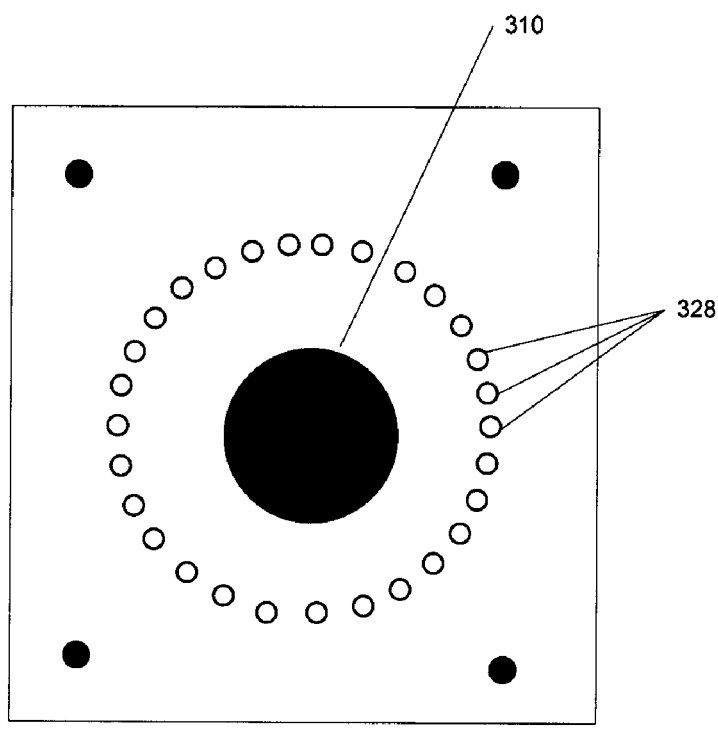
FIG. 6 illustrates a side view of an electroosmotic pump according to the present invention and positioning of thru-channels on all sides of the porous structure.

FIG. 6 illustrates a preferred embodiment in which a number of such channels 328 are positioned circumferentially around the pumping structure to allow the gas access regardless of the orientation of the pump 300 relative to gravity. For example, FIG. 6 shows such a possible arrangement.

Figure 7:
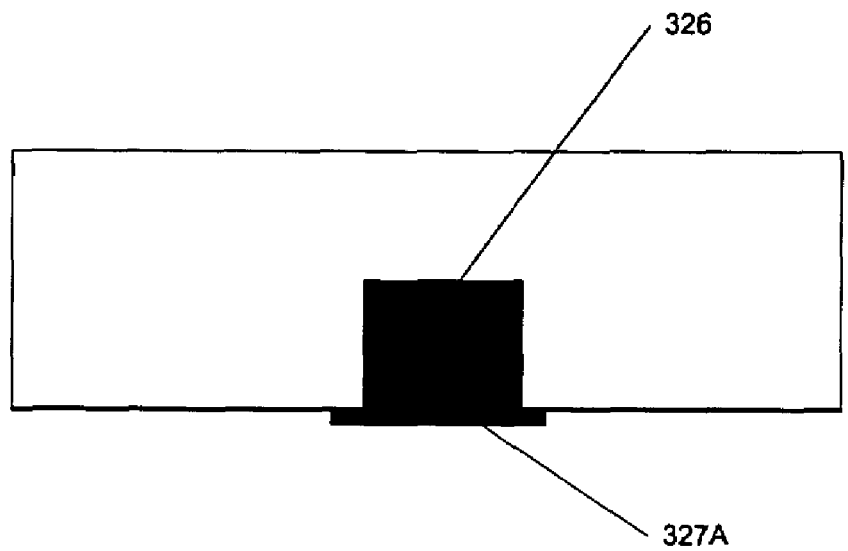
FIGS. 7–8 illustrate embodiments of membranes used to cover a catalytic recombiner.
Figure 8:
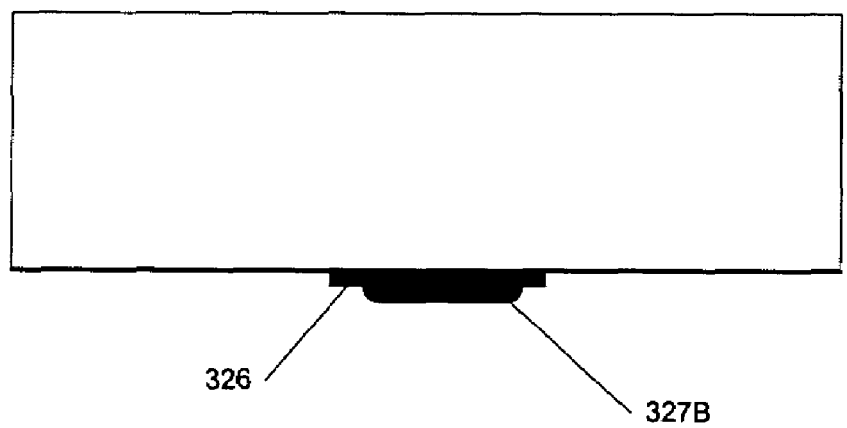
Figure 10:
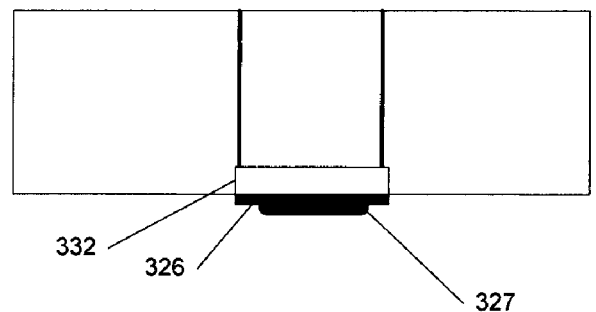
FIG. 10 illustrates the usage of a heater with a catalytic recombiner.

In some cases, the material used for the recombiner 326 catalyst suffers from reduced efficiency if it comes into contact with the fluid. In these cases, a semi-permeable membrane may be used to isolate the recombiner 326 from the liquid in the pumping chamber 312. FIGS. 7 and 8 show two possible arrangements for the recombiner 326 that use semipermeable membranes 327A and 327B, respectively, and perform this isolation function. In addition to using such a membrane 327, alleviating this problem or allowing for a fast recovery of the performance of the recombiner catalyst can also use a heater 332 to provide heating of the catalyst, as shown in FIG. 10. This heater 332 can be used to keep the recombiner 326 warm at all times, or to pulse-heat the recombiner 326 if necessary to achieve drying or performance enhancements. As discussed hereinafter, it is also possible to employ a combination of pressure sensors and thermometers to diagnose the condition of the cooling loop and of the pump 300. If, for example, pressure increases are detected, this may indicate that the recombiner 326 has become wet or needs to be rejuvenated. Application of steady heat or a brief heat pulse using the heater 332 may be used to restore the performance of the catalyst in the recombiner 326.

There are several possible material choices for the membranes 330 and 327. What is needed is a film with a dense fiber structure that allows the passage of gas while blocking the passage of water. An example material is the Gore-Tex material used in outdoor garments—these materials are known to block the passage of water while allowing the passage of vapor.

Figure 9:
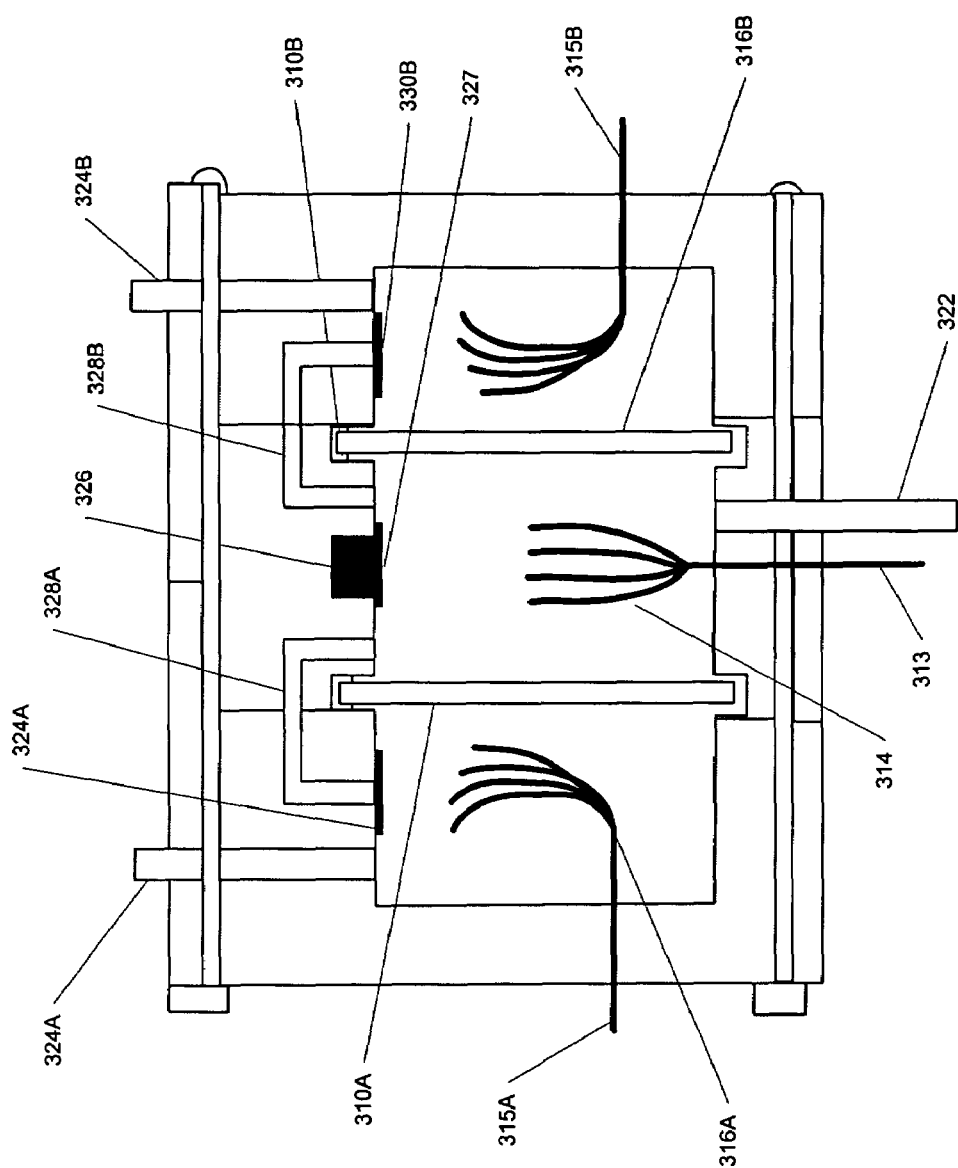
FIG. 9 illustrates an embodiment of a dual electroosmotic pump.

Another significant embodiment of the EO pump 300 is the use of more than a single porous structure 310 to generate flow. FIG. 9 shows one specific embodiment that includes a pair of porous structures 310, and pumps fluids from a single inlet 322 to a pair of outlets 324A and 324B. The flow from these two outlets 324A and 324B can be recombined to pass through a single fluidic loop, or they may be kept separate. The potentials applied to the two cathodes 316A and 316B, via electrodes 315A and 315B are not required to be the same, so this design is capable of independent control of fluid flow through a pair of cooling loops using a common anode 314 with electrode 313 and shared pumping region. This double pump architecture can also serve as a high-displacement version of the basic pump described previously. By combining the flow from the two outlets 324A and 324B, this embodiment of the pump 300 is capable of twice the volume flow of any single pump, while generating the same high voltage and operating at the same voltage. Alternatively, this arrangement can be considered as a primary pump and a back-up pump, in which one half of the pumping structure is only activated after indications of failure are recorded in the performance of the other half of the pump.

Combinations that include more than a pair of pumping structures are also possible. The use of a pair is a preferred embodiment because it is possible to position a single pair of pumping structures in close proximity to one another, allowing a 2× flowrate pump with little additional total pump volume or mass or cost. The inclusion of a second pump enables additional scenarios in which the two halves of the pump are used independently to achieve complicated flow control.

Microfabricated Planar Pump

Figure 11:
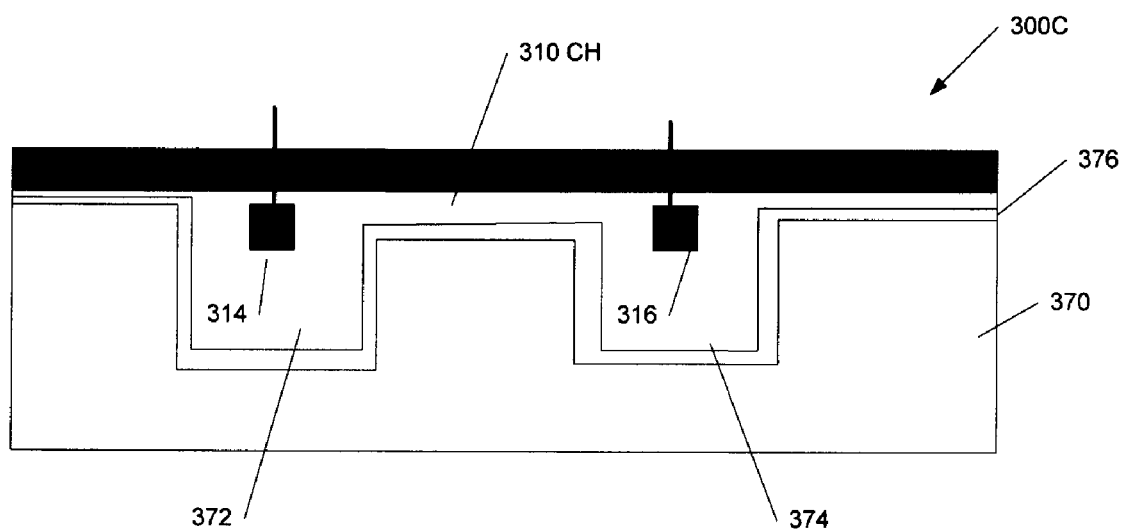
FIG. 11 illustrates an embodiment of a microfabricated electroosmotic pump.

The micromachined planar pump 300C illustrated in FIG. 11 consists of a layered-version of the EO pump 300 in which very thin planar channels 310-CH (which correspond to the channels that naturally exist within the porous structure of the above-described embodiments) are formed by etching a shallow channel 310-CH in one substrate 370, which is then coated with an insulating layer 376, such as an $Si_3N_4$ layer, and then bonding a second glass layer having a planar surface wafer to seal the narrow channels 310-CH. Alternatively, very thin planar channels oriented perpendicular to the surface of the substrate 370 may be etched into the substrate 370 to connect the inlet 372 and outlet 374 chambers. Deeper recesses are formed to provide inlet 372 and outlet 374 chambers, and to allow placement of electrodes 314 and 316 therein. Microfabricated electroosmotic pumps 300C typically generate fluid flows of less than 1 mL/min because the total cross-sectional area of the fluid pathways is substantially less than that of other versions of the EO pump 300. The missing flow can be recovered by providing a number of pumps 300C operating in parallel on the same substrate.

EO pump 300 with a microfabricated structure can also be integrated, typically a smaller EO pump due to size limitations. The micromachined "slit-pump" (i.e., electroosmotic pump with planar features) 300C described above in FIG. 11 is intended as one version of the EO pump 300 that can be fabricated entirely from microfabricated silicon structures, and would be compatible with the fabrication of the other apparatus. In some cases, this degree of integration will reduce the overall complexity of the installation, and might result in reduced manufacturing cost. Integration of the controller with this structure is also possible. Other examples of suitable electroosmotic pumps with planar features are described in co-pending, commonly assigned patent application "Electroosmotic Micropump with Planar Features", patent application Ser. No. 10/449,564, filed on May 30, 2003. The entire disclosure of this co-pending application is hereby incorporated by reference into this description.

Aerojel Pumping Element

This approach relies on an alternative structural form of porous silica, called an aerogel. The key advantages of this material for formation of EO pumps 300 is the very high porosity, so it has a much higher electroosmotic flowrate and much lower mass (weight). Also, there is potential for casting of the aerogels into desired shapes; possibly onto electrode structures. These materials can also withstand high temperature processing.

Optimization of the Working Fluid of the Pump

Water, preferably De-Ionized Water ("DI") water, is the current working fluid for electroosmotic pumps 300. In addition to the excellent thermal properties such as a high latent heat of vaporization, water also supports electroosmosis and its electrolysis products, hydrogen and oxygen gas, can be conveniently recombined with a catalyst.

Figure 12:
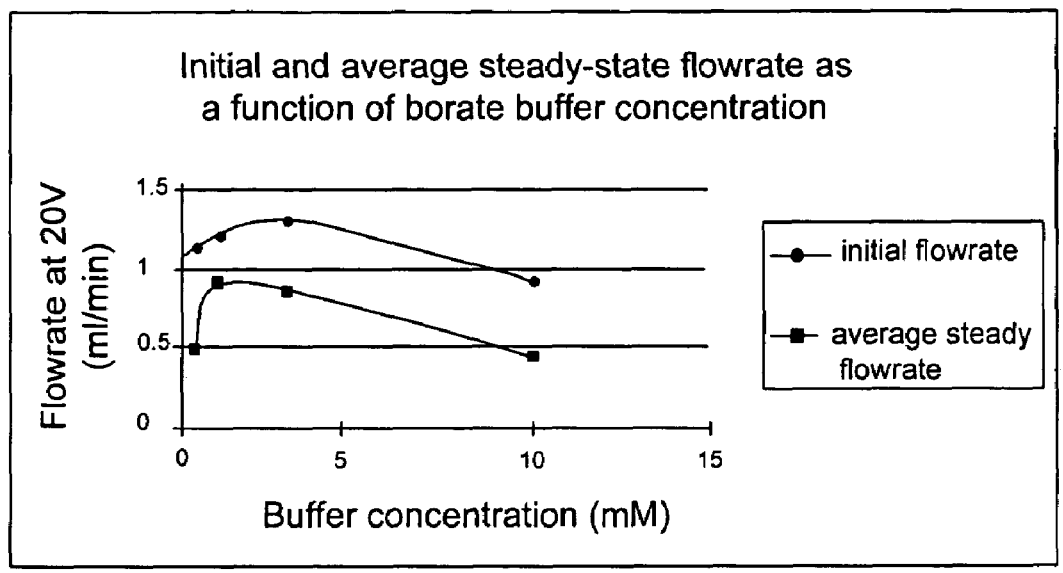
FIG. 12 illustrates a table illustrating flowrates as a function of the fluid being used.

The performance of pump 300 has been optimized by varying the composition of the aqueous working fluid. An example of such optimization is shown in FIG. 12, where the initial and average steady-state flowrates are plotted vs. concentration of sodium borate disposed therein. The peak performance is near 3 mM of this electrolyte. It is possible that the optimum performance of another electrolyte may occur at a somewhat different concentration, since the chemical reason why the flowrate can be affected by electrolyte composition and/or concentration is not completely understood.

It may be important, however, that the electrolyte either be electroinactive, or completely reversible, so that an electrolysis byproduct does not build up over time. For example, chloride ion electrolysis will produce chlorine gas in place of oxygen at the anode, and our catalyst probably does not recombine chlorine with hydrogen. Furthermore, the dissolved chlorine is a much more corrosive working fluid than one containing dissolved oxygen gas.

Another reason why sodium borate was chosen is that it represents two of the three main constituents of the glass material from which the porous polymer frits have been fabricated. Thus, the electrolyte also tends to suppress dissolution or transient chemical modification of the porous medium. Another similar electrolyte might be better at providing a stable, electroosmotically-active, surface to the porous medium.

Figure 13:
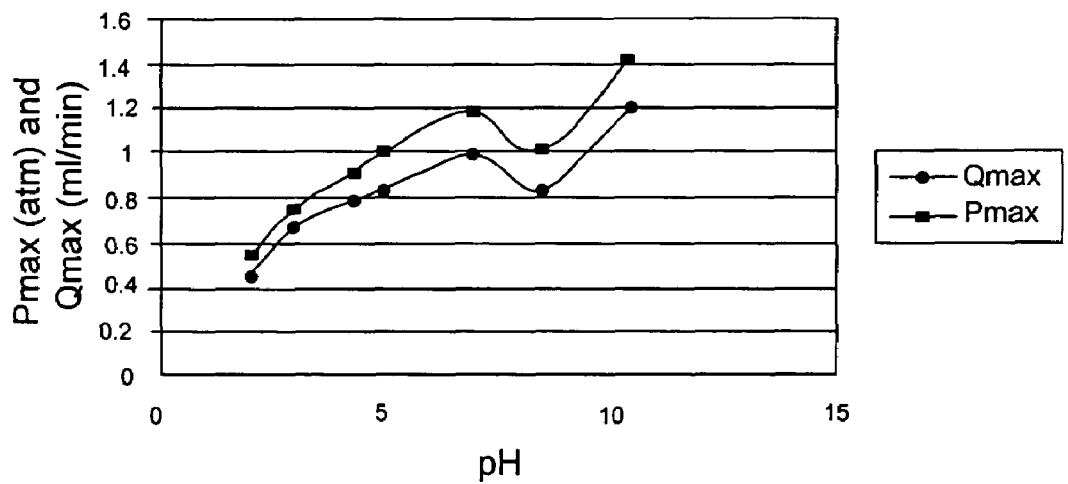
FIG. 13 illustrates a table illustrating flowrates as a function of the pH of the fluid being used.

Another feature of an optimized working fluid is control over pH, especially to suppress the acid-generating property of the anode compartment. The reason the suppression of low pH is important is that the electroosmotic flow dramatically decreases with lowering pH, as shown in FIG. 13.

Figure 14:
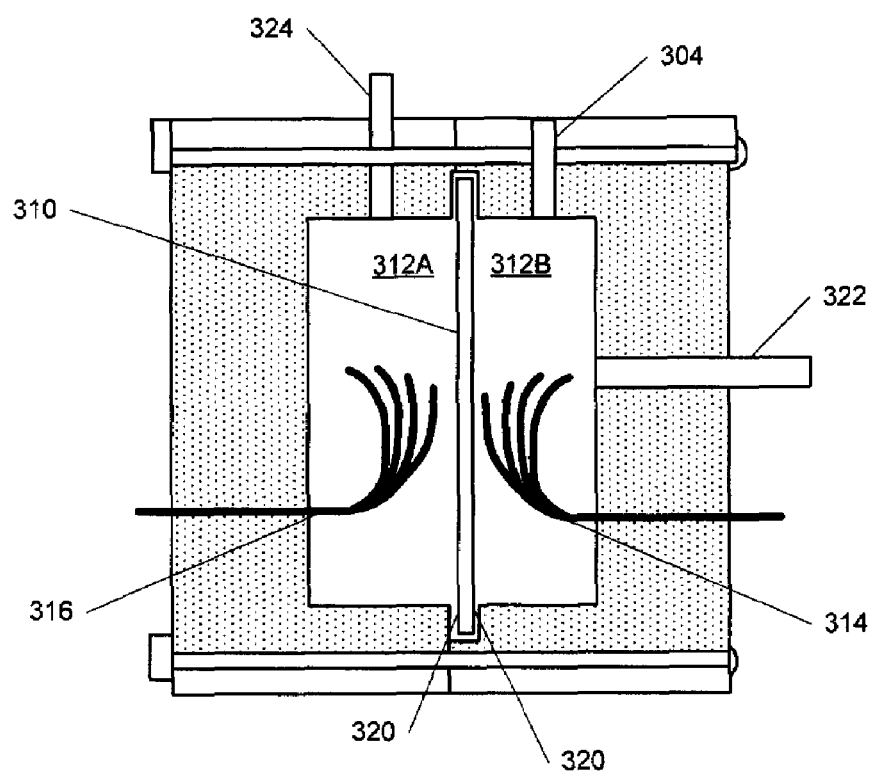
FIG. 14 illustrates another embodiment of an electroosmotic pump.

In a specific open-loop embodiment as shown in FIG. 14, an electroosmotic pump 300 is shown in which the gas generated by electrolysis on the anode side of the pump is allowed to escape to the surroundings. In some cases, it is necessary to recapture this gas and recombine it to form fluid and retain all the fluid in the system. However, there will be other applications in which there is no need to recover the gas. It is necessary, in this case, to provide a vent of some type for the gas to escape the pump 300. On the anode side 312A of the pump 300, the gas generated cannot pass through the porous structure 310, so it is necessary to provide a vent 304. On the cathode side 312A, the gas can escape with the fluid through the outlet 324 as shown, or it can be vented as well. If the gas generated on the cathode side 312A passes through the rest of the cooling system, it will eventually arrive at the anode side 312B of the pump 300, where it might recombine or it might escape through the vent 304.

Control of Electrolysis Gases in Electroosmotic Pumps

This section describes several methods to control electrolytic gases in electroosmotic pump systems. These methods include direct venting of the gases to the ambient through gas-permeable membranes, flow control of gases and reclamation of water (vapor or liquid) using a reverse osmotic membrane in a sealed system.

A. Control of Gas Venting Using Gas-Permeable Membranes

Figure 15:
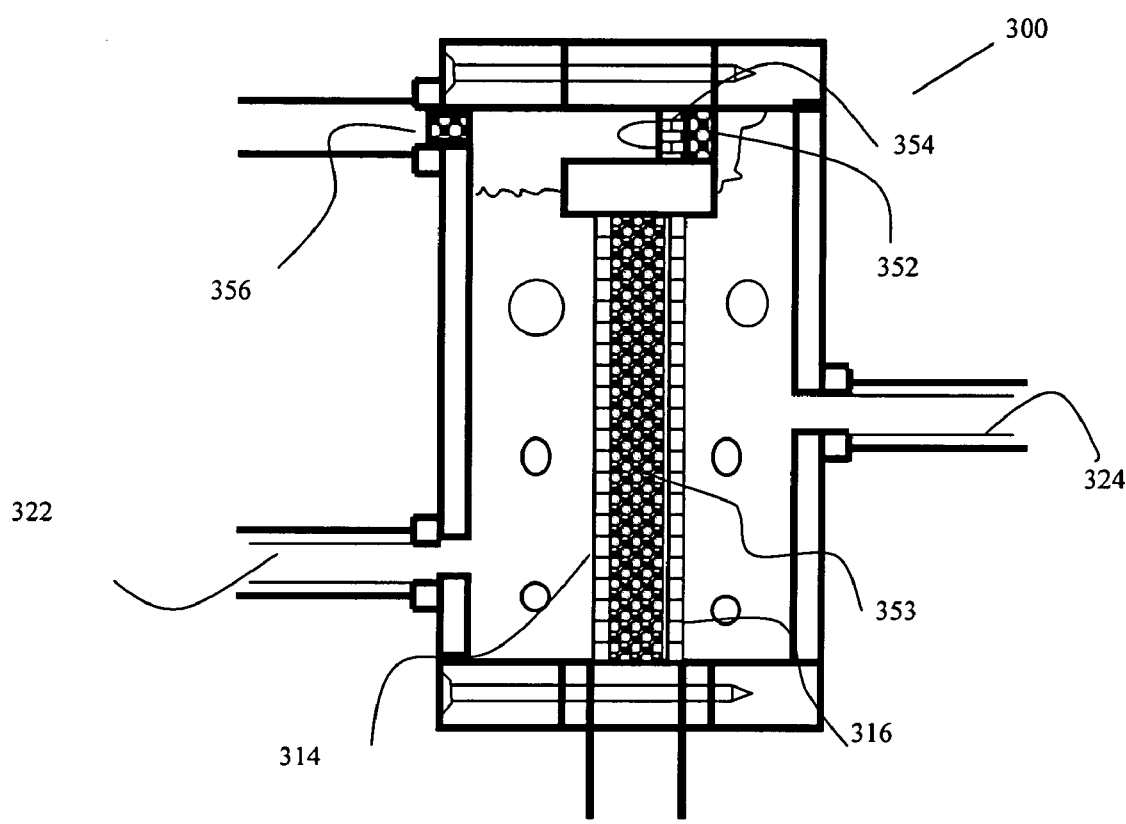
FIG. 15 illustrates an embodiment for control of gas venting using gas-permeable membranes.

Gas-permeable membranes can be used to remove electrolytic gases generated within a closed-loop fluidic system. The gas-permeable membrane vents electrolytic gases to the surroundings while retaining the working liquid within the system. FIG. 15 illustrates an embodiment for venting the gases from an electroosmotically-pumped fluidic system using a gas permeable membrane. Fluid enters the pump 300 through inlet 322 and leaves the pump through outlet 324. Structure 353 is in the electroosmotic pump. Cathode 316 and anode 314 provide an electric field across the pumping structure.

The gas control for this system is achieved in two stages. First, electrolytic gas generated on the outlet side is channeled to the inlet side through a gas permeable membrane 352. This membrane may be supported by a mesh structure 354. Note that this first-stage membrane 352 supports a pressure difference from the outlet (high pressure) side to the inlet (low pressure) side of the pump. The second stage of gas control is a second gas permeable membrane 356 that vents the gas to the surroundings. The gas generated in the outlet side can reach the venting spot in the inlet side by flowing through the fluidic circuit with liquids if that is not a problem.

The gas generated in the outlet side can be vented to the surroundings separately from that in the inlet side. For example, it may be vented immediately at the downstream port by using a membrane similar to membrane 352. Or the generated gas may be vented somewhere outside the pump system using a similar design as the one in the outlet port after the gas flows out of the pump system with liquids. Although several embodiments can achieve the same goal of venting the generated gases, the one illustrated in FIG. 15, is believed to be the most efficient and compact one.

As implied in FIG. 15, one variation of this method is to use two different gas-permeable membranes to vent electrolytic gases in both the region of the pump inlet and the pump outlet. A disadvantage to this venting approach is that, eventually, the working liquid in the fluidic loop gradually is converted to gas (and then vented) so that the amount of working liquid within the loop is reduced.

B. Gas Venting Combined With Catalysts

Figure 16:
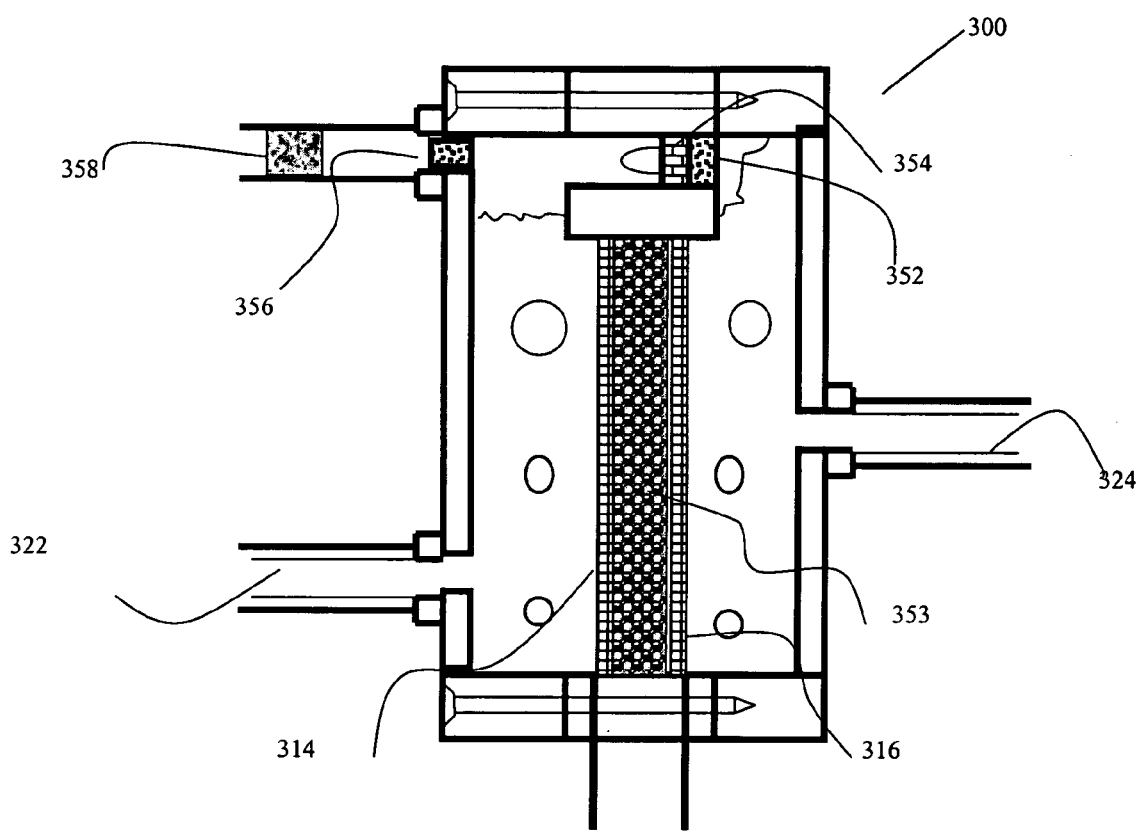
FIG. 16 illustrates an embodiment for control of gas venting using gas-permeable membranes combined with catalysts.

Another embodiment is depicted in FIG. 16. Gas generated downstream can, again, be directed to the upstream side using a first-stage gas-permeable membrane 352. Instead of being vented directly to the ambient (as illustrated in FIG. 15), the gases go through a venting flow channel (also referred to herein as venting channel, exhaust channel or vent) fitted with a catalyst 358. At this catalyst site, part (or all) of the electrolytic gases are converted prior to venting. In the case of water systems with inert (e.g., platinum or graphite) electrodes, hydrogen and oxygen are created at the cathode and anode, respectively. For this example, a platinum catalyst can be used to convert hydrogen and oxygen to water. With an appropriately thermally insulated catalyst 358 (or externally heated catalysis region) the product of the catalytic reaction is water vapor that can then be vented to the ambient. An advantage of this approach is that the amount of hydrogen and oxygen gas that is vented to the atmosphere is reduced or eliminated. Hydrogen and oxygen mixtures can be explosive.

C. Gas Control In Sealed Fluidic Loops

Figure 17:
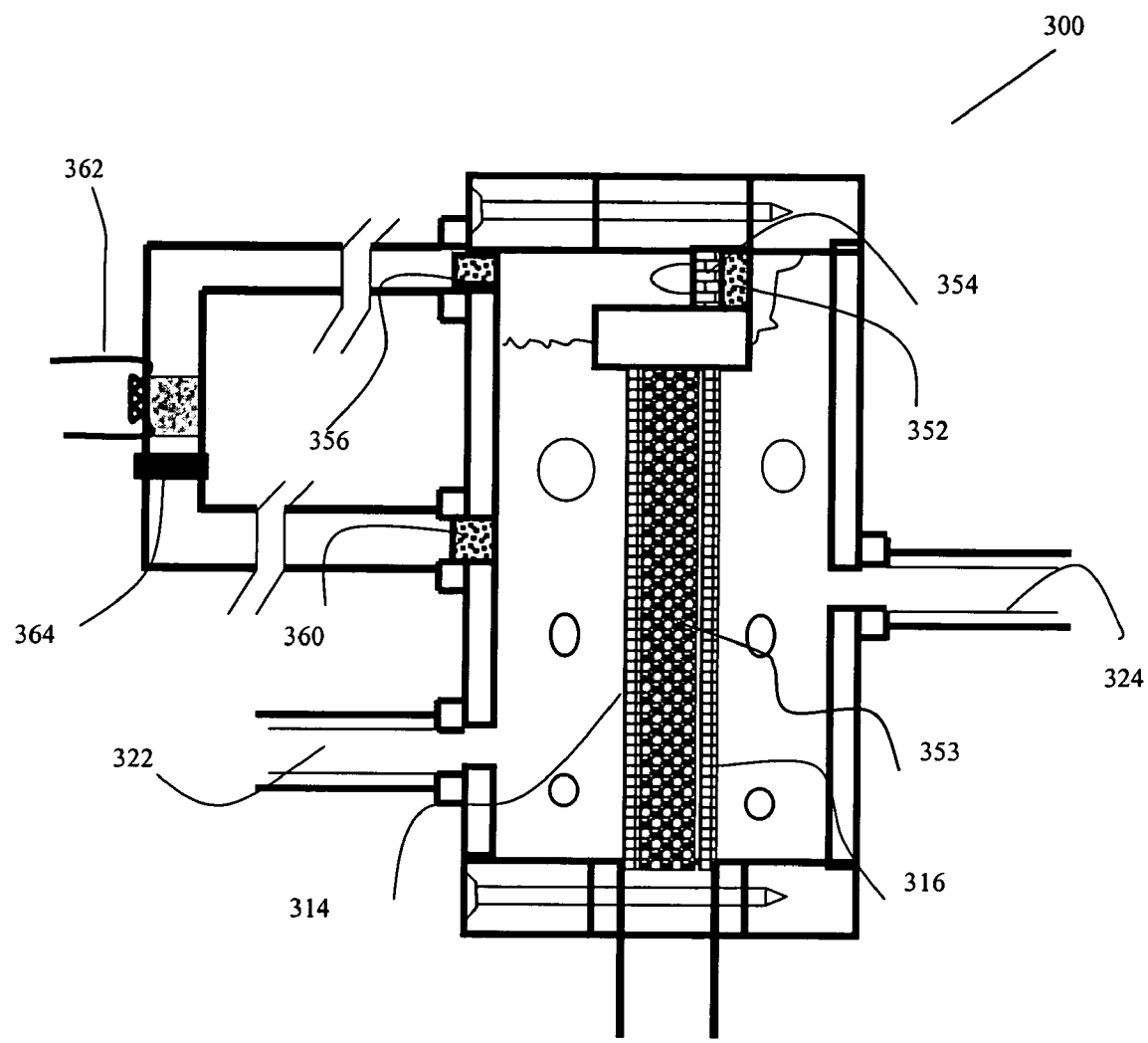
FIG. 17 illustrates an embodiment for control of gases in sealed fluidic loops.

If the electroosmotically-pumped system needs to be completely sealed from the ambient, the embodiment shown in FIG. 17 can be used. This system recombines generated hydrogen and oxygen into water using a catalyst 358 and the water is reclaimed by the sealed system using a reverse osmotic membrane 360. This embodiment is a method of controlling the flow of gases (e.g., hydrogen, oxygen, and water vapor) and liquid (e.g., water) to achieve the reclamation of water in a sealed fluidic loop system. As in the previous two embodiments (FIGS. 16–17), a first-stage semi-permeable membrane 352 can be used to direct downstream gas through a "bypass" channel into the inlet side of the pump. From the inlet side, electrolytic gases are directed through a channel to a catalyst region 358 where they are recombined to water vapor. Catalytic product vapor then condenses in the catalyst channel (also referred to herein as secondary loop or secondary flow channel) and reenters the inlet region of the pump through a reverse osmotic membrane 360. This reverse osmotic membrane 360 is used to transport liquid from the low-pressure side of the catalyst channel (the region immediately downstream of the catalyst) to the relatively higher-pressure side of the pump inlet. That is, this osmotic membrane 360 can be used to have a minimum pressure region at the catalyst 358, an intermediate pressure at the inlet 322 of the pump, and a high pressure downstream of the pump. Gas generated downstream of the pump, flows into the region upstream of the pump through the first-stage semi-permeable membrane 352 (where it combines with gas generated at the upstream electrode). The gas mixture then flows to the lowest pressure point in the system: the catalyst region. The catalyst 358 combines the electrolytic gases into vapor product (e.g., water vapor in the case of hydrogen/oxygen recombination). This vapor condenses (e.g., into water) and is then pumped into the intermediate pressure region immediately upstream of the pump where it is recombined with the working liquid in the sealed loop.

In this third embodiment, a heater 362 (or any hot source in the system) may be used to prevent catalytic product in liquid form from touching, and thereby reducing the effectiveness of, the catalyst 358. In some cases, the heat of reaction of the catalyst reaction may be enough to keep the catalyst dry. Furthermore, the catalyst 358 can also be kept dry by adding a gas permeable membrane 364 in the secondary loop immediately downstream of the catalyst 358. Membrane 364 prevents the catalyst 358 from becoming wet by the condensed liquid (e.g., water) immediately upstream of the osmotic membrane 360. The region in the secondary loop between membrane 364 and osmotic membrane 360 is the lowest pressure region in the sealed loop system. The temperature in this region is also significantly lower than in the region of the heated catalyst 358.

Figure 18:
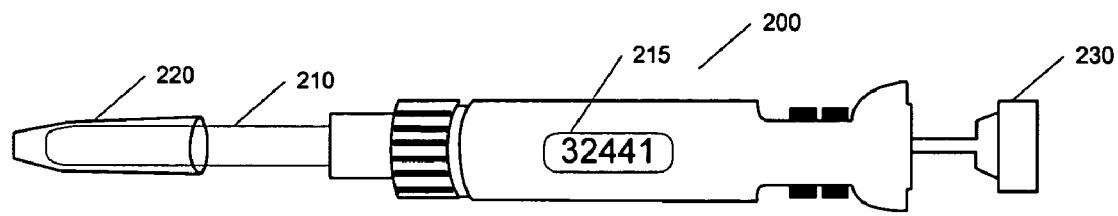
FIG. 18 illustrates an example of a typical manual pipettor.
Figure 19:
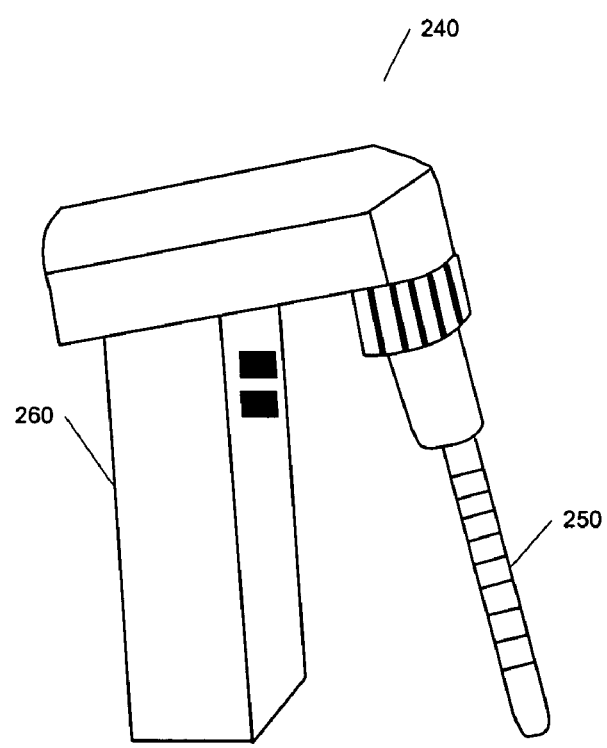
FIG. 19 illustrates an example of a typical pipette-aid device.
Figure 20:
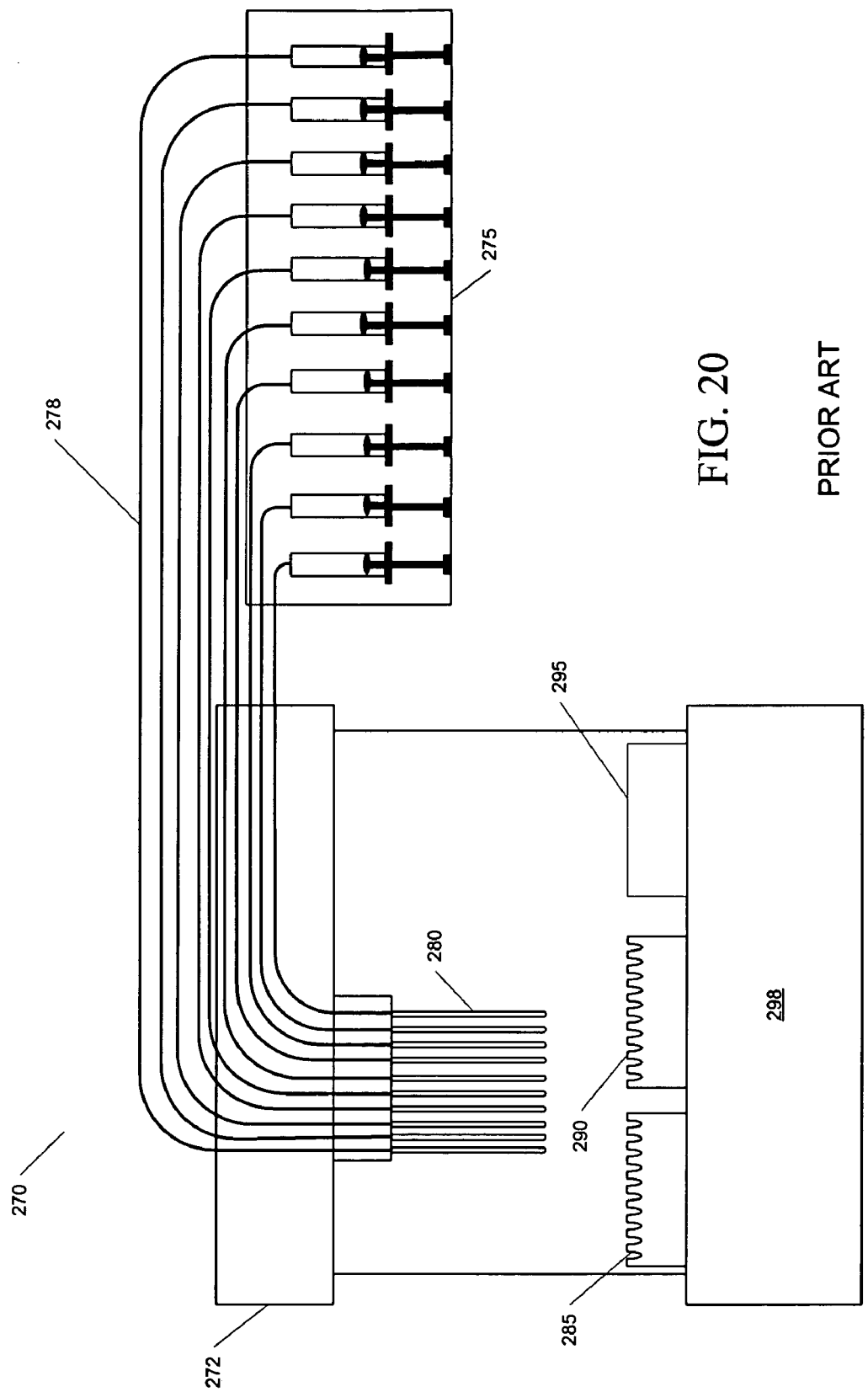
FIG. 20 illustrates an example of a typical robotic/pipetting device.

In liquid handling embodiments of the invention, using the electroosmotic pumps described herein, a solid state pipettor can be fabricated using an electroosmotic pump integrated with a fluid sensor. FIGS. 18–20 depict typical prior art liquid sampling devices including a single channel pipettor 200, a single channel pipette aid 240 and a multi-channel robotic pipettor 270, respectively. The main components of such a device are an aspirating end which holds a liquid sample, a liquid sample driving mechanism, a means to set the volume pipetted, and a power supply with associated control electronics. The aspirating end which holds the liquid sample will typically be a tube 210 or other flexible conduit onto which disposable pipette tips 220 are applied as shown in FIG. 18, or in the case of pipette aids as shown in FIG. 19, the entire pipette tube 250 is disposable. The digital readout 215 on pipette 200 represents the amount of liquid sample to be drawn into the pipette.

Figure 21:
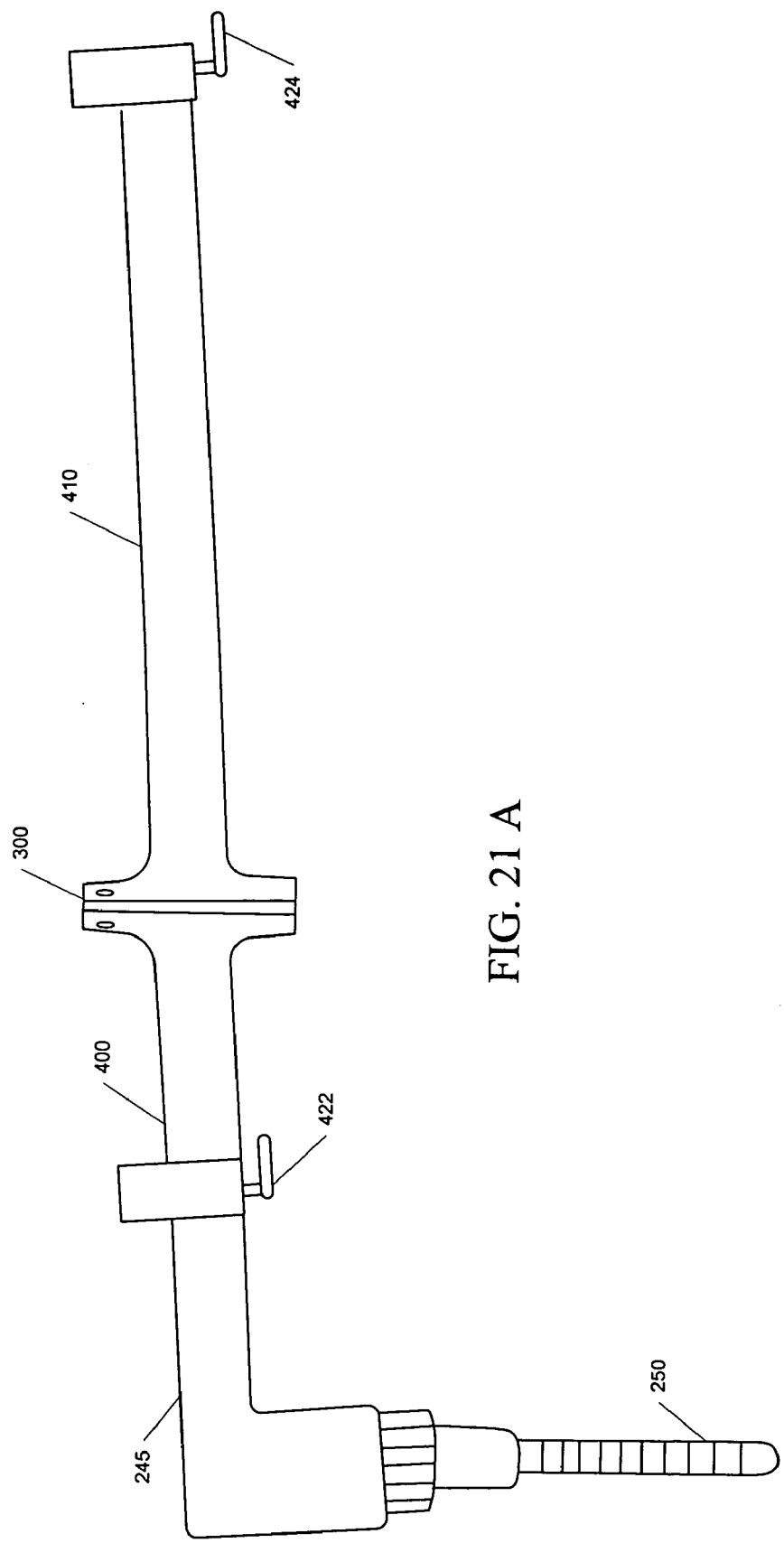
FIG. 21A illustrates an embodiment of an electroosmotic pump integrated with a pipette-aid for liquid handling.
FIG. 21B illustrates an embodiment of an electroosmotic pump integrated with a pipettor in a compact arrangement.
FIG. 21C illustrates an embodiment of an electroosmotic pump with a voltage source.

The electroosmotic pump 300, as illustrated in an embodiment using a pipette aid 245 in FIG. 21A, is the liquid sample driving mechanism. The mechanical piston or pump (230 in FIG. 18; 260 in FIG. 19) in typical pipetting devices is replaced by an electroosmotic pump 300 which uses the working fluid conveyed in the conduit 400 instead of a mechanical piston to drive the liquid sample. In the art of fluid mechanics, the term used frequently to describe the fluid conveyed is "fluid column." A fluid column is also known as a "liquid column" or "liquid bridge." The working fluid can be optimized for performance in the pump 300, since the working fluid never comes into contact with the biological or chemical sample. As is the case with any mechanical piston based pipette, there is an air gap between the fluid "piston" (i.e., the fluid conveyed in the conduit) and the sample. Alternatively, an immiscible fluid barrier can be used.

FIG. 21A depicts conduit 400 attached to the inlet side of pump 300 and conduit 410 attached to the outlet side of the pump. The polarity of the electrodes in electroosmotic pump 300 can be reversed to drive the working fluid in the opposite direction through the pump. T-valves 422, 424 are used for refilling/recharging of the working fluid. Since the fluid conveyed in the conduit 400 (attached to pipette aid 245 in FIG. 21A) cannot be manipulated like a mechanical piston, the means to set the volume pipetted is a device that detects the position of the fluid in the conduit. Such detection can be accomplished with optical sensors or capacitive or other electrical sensors located in proximity to the conduits 400, 410. As an alternative to the use of sensors to detect position of the fluid in the conduit, an electroosomotic pump that is calibrated with sufficient accuracy can be used for precise dispensing of the desired amount of liquid. This is accomplished by applying a given voltage across the pump which provides a pumping rate that is maintained for a specific length of time in order to dispense the precise amount of liquid.

Figure 21B:
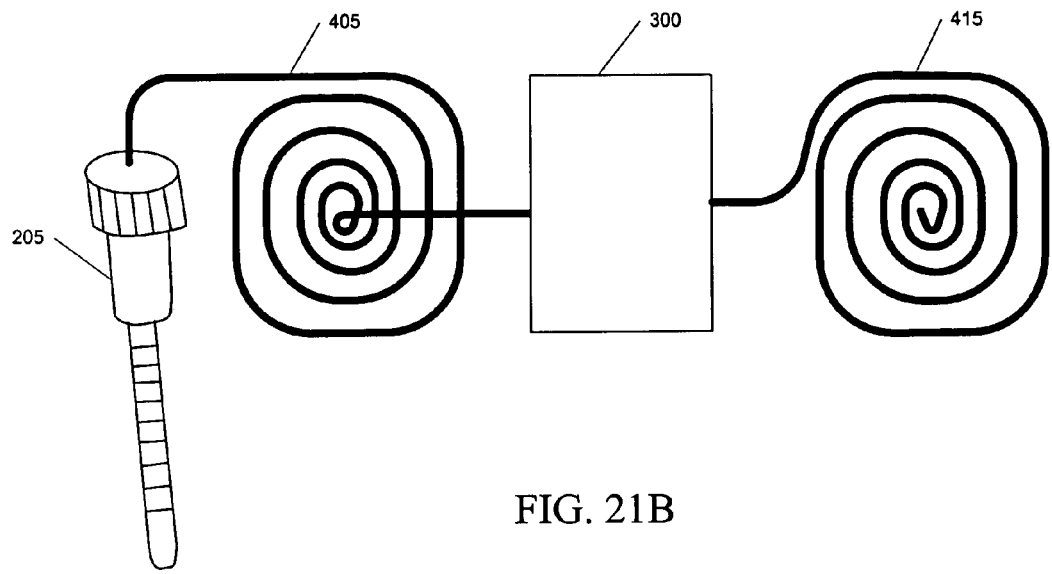

FIG. 21B depicts a pipette 205 with a coiled or wrapped length of tubing 405 (again referred to more generally as a conduit) for conveying the working fluid to and from the electroosmotic frit pump 300. The wrapped length of tubing 405 is shown attached to the inlet side of pump 300. Another length of wrapped flexible tubing 415 is shown attached to the outlet s side of pump 300. Using wrapped lengths of tubing as conduits reduces the overall footprint of the electroosmotic driven pipette or pipette aid. A similar concept to reduce overall footprints can be used with a planar electroosmotic pump by etching nonlinear inlet and outlet conduits in the planar pump substrate. Such conduits can be winding, coiled, zig zag, circular, curvilinear, or other patterns etched in the substrate.

Figure 21C:
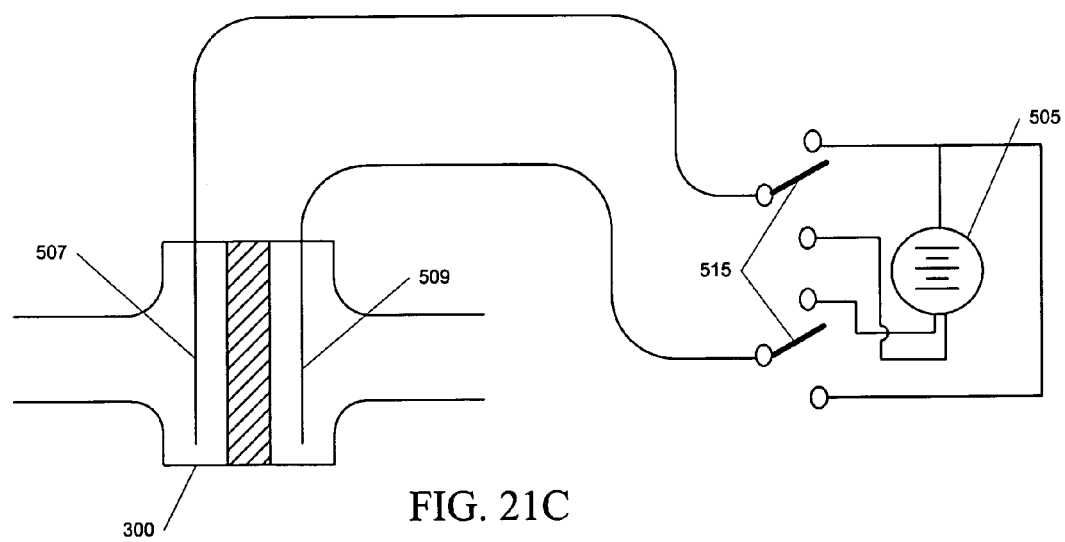

FIG. 21C depicts a simplified arrangement for pump electronics. A simple battery 505 will supply the voltage needed through electrodes 507, 509 for operation of the electroosmotic pump 300. The simple battery 505 can be replaced with more elaborate electronics including the controller described previously. With switch 515 in the "up" position, the dispense button is pressed. W ith the s witch i n the "down" position, the a spirate b utton i s d epressed. More complicated electronics are needed to provide for different pumping voltages, and to incorporate sensors to detect when refill of the working fluid is needed.

FIG. 22 depicts an embodiment of an eletroosmotic pump incorporated into a manual (hand-held) pipettor. The figure shows pipette tube 235 with a disposable pipette tip 225 on the end of the tube, wrapped tubing for conduit 420, an outlet side conduit 425, and a pair of fluid level detectors 430, 440. The fluid level detectors 430,440 determine the starting and ending positions of the fluid in the conduit 425 and define the volume pipetted. The fluid level detectors can be sensors of various types, including optical, capacitive or resistive, although the invention is not limited to these examples. The sensor marking the end position of the fluid in the conduit is moveable. Alternatively, an array of sensors can be positioned along the length of conduit 425 to determine the volume pipetted, or a single sensor can be used that spans the range of fluid movement and is, in effect, a continuous sensor.

There are various options for a solid-state pipetting device including either single channel dispensing or multiple channel dispensing. The electroosmotic pump 300 can be programmed to easily switch between single channel and multiple channel dispensing, unlike most manual pipettes. Management of gases produced by electrolysis in the electroosmotic pump 300 can be handled by a catalytic combiner as described above. The electrolysis gases can also be vented to atmosphere through gas permeable membranes, e.g., a Gortex membrane. Some mechanism for recharging the fluid "piston" can also be provided, such as a valve through which additional fluid can be added.

Regarding the type of electroosmotic pump to be used, for liquid pipetting and dispensing applications, both the frit-based pump and slit (planar pump) described herein will work well. However, except for small volume precision pippetting, a capability for high flow rate (and reasonable pressure) is desirable, i.e., typical users in a lab will not want to wait while the pippetter slowly draws a sample. Therefore, for higher flow applications, the frit-based pump will have an advantage.

In another liquid handling embodiment of the present invention, an electroosmotic pump is used for a solid-state liquid dispensing application including robotic liquid handling for sample preparation, chemical synthesis, and automated biochemical assays. Many robotic liquid handling instruments 270 such as that exemplified in FIG. 20, use syringe 275 or piston-pump based pipettors as components. Fixed robotic liquid handling stations can be arbitrarily complex and do not require the integration of all of the pipetting components into a single hand-held configuration.

FIG. 20 illustrates a multi-channel robotic liquid handling device 270 having a robotic/pipetting arm 272 to which multi-channel pipettes 280 are attached. Syringe pumps 275 drive liquid samples into pipettes 280 through tubing 278. Sample or well plates 285, 290 can be used for dispensing of the liquid in the pipette tips. The liquid samples can also be dispensed to form genetic, proteomic, or small molecule arrays wherein electroosmotic flow enables precise metering of liquid. Electroosmotic pumping enables the dispensing of very precise amounts of fluid to surfaces such as those used as substrates for microarrays. Glass slides and nitrocellulose or other membranes can also be used for dispensing. Also shown in FIG. 20 are pipette tip wash/dry station 295, and well plate deck 298. If disposable tips are used, station 295 can be a pickup/trash station.

Figure 24A:
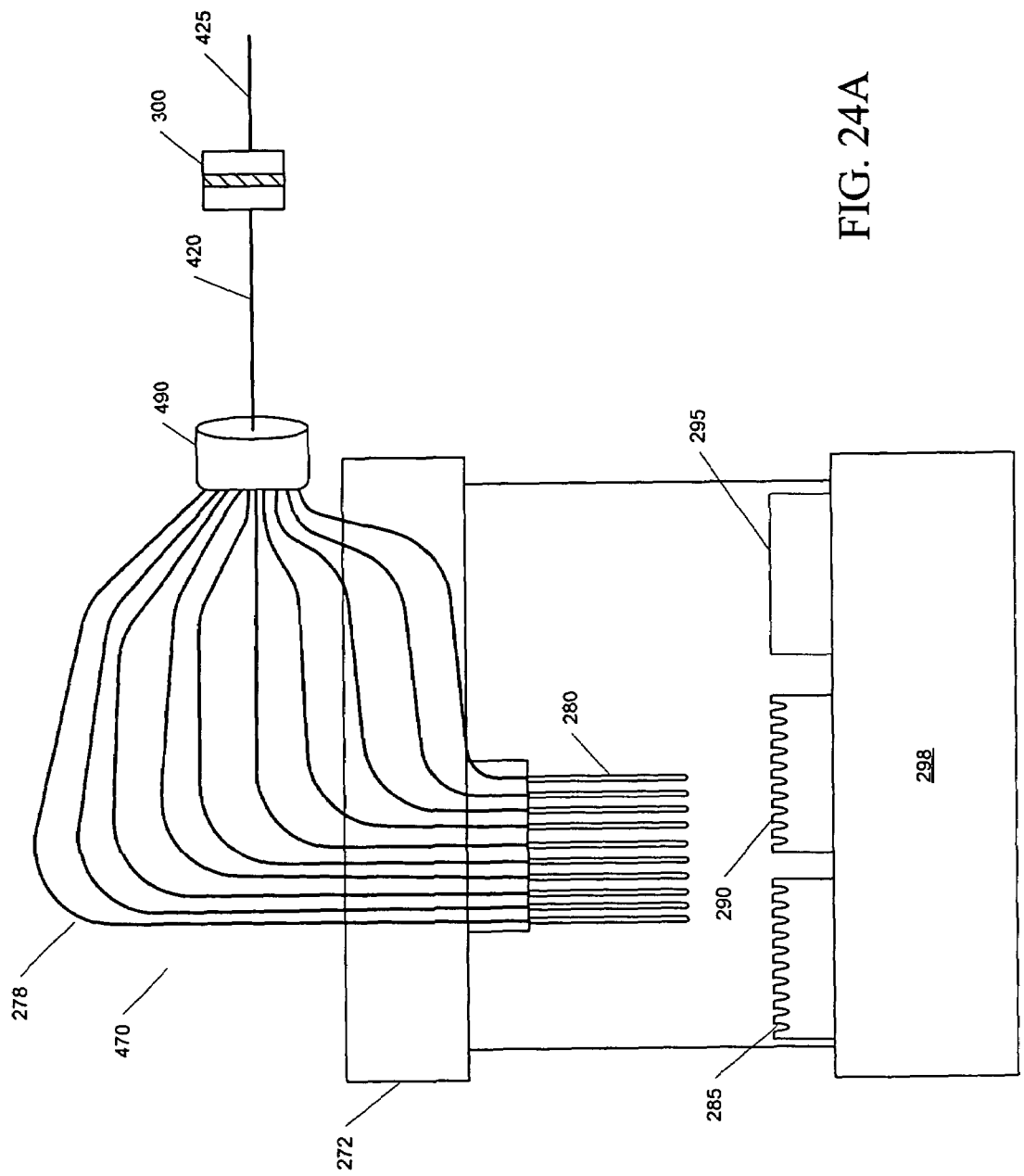
FIGS. 24A–24B illustrate single and multiple pump embodiments of robotic electroosmotic pump liquid handling systems.
Figure 24B:
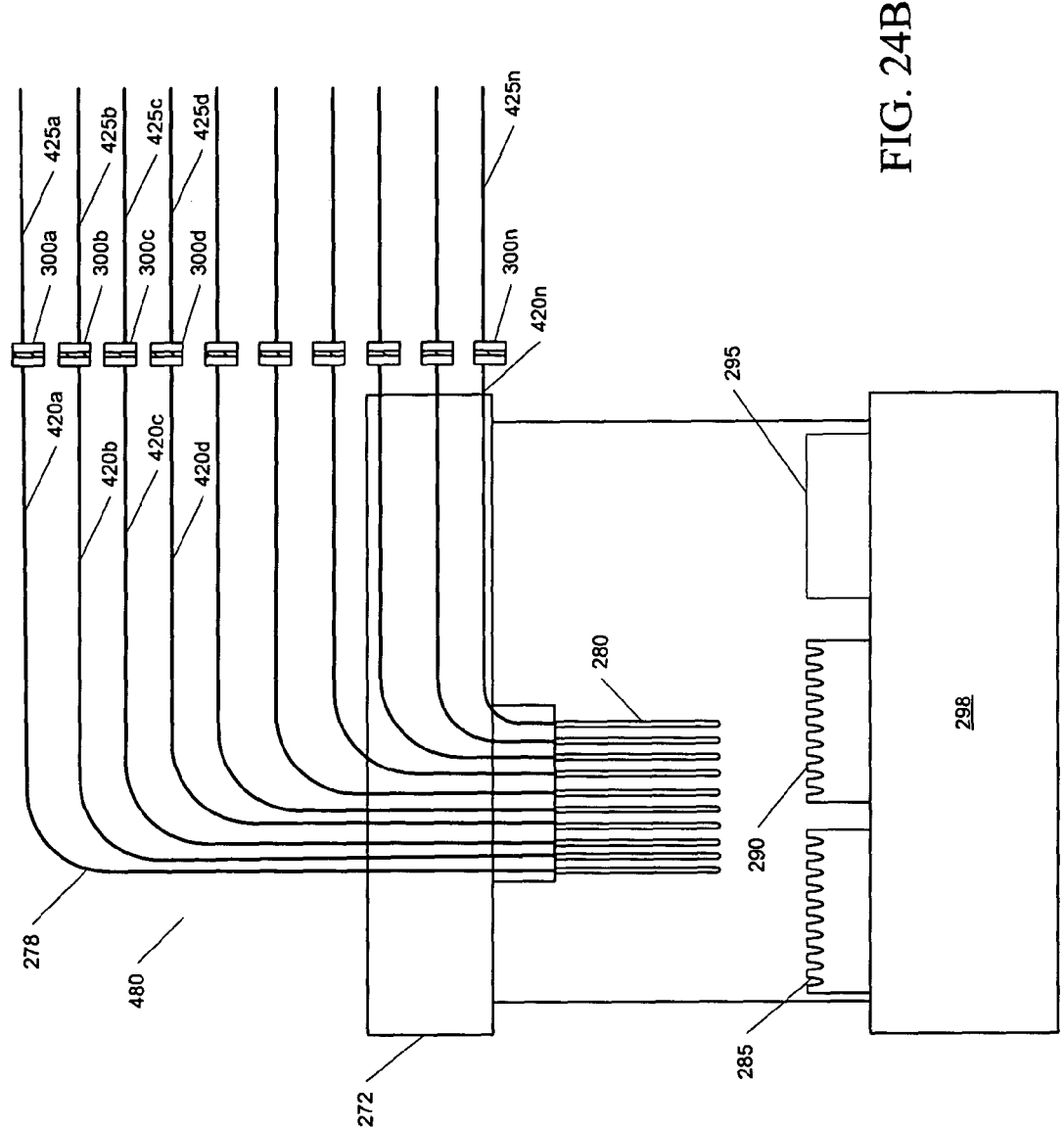

The robotic electroosmotic pump dispensing system can incorporate multiple liquid channels with valves to switch among them. FIGS. 24A–24B illustrate robotic systems 470, 480 that use one or more electroosmotic pumps to drive an associated fluid column in a manner to cause the aspiration or dispensing of liquid samples. A single pump 300 can feed multiple channels through flexible tubing 278 to pipettes 280 as shown in FIG. 24A, or multiple pumps 300a, 300b, . . . 300n can be incorporated with one pump per channel as shown in FIG. 24B. In FIG. 24A, the syringe pumps 275 of FIG. 20 are replaced by electroosmotic pump 300. A multi-port air valve 490 provides an air gap between the liquid in the tubing 278 and the working fluid in conduit 420. Neither the liquid dispensed nor the working fluid will pass through the multi-port air valve. A multi-port fluid valve can also be used as an alternative embodiment. This would enable the working fluid to be driven closer to the pipettes. Since the working fluid would get pumped past the valve, the working fluid in the pump could become depleted by pumping it out into a single channel, then switching lines (i.e., conduits) and pumping into another channel. A pump controller would need programmed logic to track the volume remaining in the conduits. The advantages of using a fluid valve include potentially less leakage of working fluid, and the capability to flush the pipettes with working fluid between uses.

In FIG. 24B, tubing 278 for each channel is connected to a corresponding conduit 420a, 420b, . . . 420n carrying a fluid column, i.e. working fluid, that is conveyed through a corresponding electroosmotic pump 300a, 300b, . . . 300n, respectively. The working fluid is driven through each pump into a corresponding outlet side conduit 425a, 425b, . . . 425n, respectively.

The fluid level detectors such as those shown in FIG. 22 can be used with robotic electroosmotic pump dispensing systems 470, 480 to determine the starting and ending positions of the fluid in the conduits 425, 425a, 425b, . . . 425n and define the volumes pipetted. The fluid level detectors can be sensors of various types, including optical, capacitive or resistive, although the invention is not limited to these examples. The sensor marking the end position of the fluid in the conduit is moveable. Alternatively, an array of sensors can be positioned along the length of conduits 425, 425a, 425b, . . . 425n to determine the volume pipetted, or a single, continuous sensor can be used that spans the range of fluid movement. Furthermore, an electroosomotic pump that is calibrated with sufficient accuracy can be used for precise dispensing of the desired amount of liquid can be used in place of sensors. This is accomplished by applying a given voltage across the pump which provides a pumping rate that is maintained for a specific length of time in order to dispense the precise amount of liquid as described previously.

Some robotic dispensing systems require repetitive application of a specific reagent as a dilutant or washing agent. In those cases, flow through electroosmotic pumps can be dedicated to those lines, provided the occasional electrolysis bubble does not become an issue. If electrolysis bubbles are a problem, the gas generated can also be shunted by gas-permeable membranes.

In another liquid handling/sampling embodiment of the present invention, illustrated in FIG. 23, the electroosmotic pump is advantageous due to the fact that a porous glass frit pump 600 acts effectively as a filter, defined by the size of its pores. In this embodiment, the closed loop of the typical pump is effectively broken with one side of the pump used as a filtration or concentrating chamber. For example, an environmental sampling device might take a water sample from waste sludge. The open end of the sampling tube (chamber) 650 contains one of the driving electrodes 602 and ends at one side of the frit pump 600. By applying an electric field via electrodes 602, 604, water will be driven through the frit pump 600 via electroosmosis and particles larger than the pores of the frit will be excluded. An uninterrupted current path needs to be maintained between the electrodes. This means that an electrolyte needs to be flowing between the electrodes. Therefore, before electroosmotic pumping can begin, either the sampling chamber can be filled with a fluid, or the frit can be allowed to wet by capillary action if an electrode is deposited on the frit surface.

The high pressure generated by the electroosmotic pump 600 can then be used to drive the partially filtered water through a reverse osmosis membrane (not shown), producing a "clean" or filtered sample that is stored in storage area 630 of the sampling tube 650. Provided that no solvents or other toxic fluids were present, such a device can serve as a water filter to produce potable water. On the other hand, if the "sludge" is the component of interest, this concept can be reversed. A sludge sample can be placed in the chamber 650 and excess water can be drained from the sample via an electroosmotic pump concentrating the item of interest.

For the filtering/concentration applications, the frit-based pump will likely be preferable for two reasons. The first reason is that the pore size of the frit-based pump is smaller (relative to current planar pump designs). The second reason is that the frit-based pumps are easier to work with because they can be mounted in removable cartridges, and swapped out when the frit becomes plugged. Removal of cartridges would also reduce the possibility of cross contamination between uses. The increased flow of the frit-based pumps will again be a significant advantage. In addition, the cost of a frit cartridge is likely to be considerably cheaper than a microfabricated pump that can deliver an equivalent flow. However, if only small volumes are being sampled, a planar pump can be paired with filters at the inlet, thereby accomplishing a similar goal.

Those skilled in the art will appreciate that many modifications to the exemplary embodiment of the present invention are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. An apparatus for use as a solid-state liquid sampling device, comprising:
   a pipettor for drawing a volume of a liquid sample;
   a pair of conduits for conveying a working fluid, with a first conduit connected to the pipettor; and
   an electroosmotic pump disposed between the conduits for pumping the working fluid from the first conduit to a second conduit upon the application of a voltage in order to draw the volume of the liquid sample into a pipette.

2. The apparatus for use as a solid-state liquid sampling device of claim 1 further comprising a fluid sensor integrated with the electroosmotic pump for detecting a position of the working fluid in the conduit as the liquid sample is being drawn, wherein the position of the working fluid provides an indication of the volume drawn.

3. The apparatus for use as a solid-state liquid sampling device of claim 1 wherein the voltage is applied for a predetermined period of time to pump the working fluid to a point in the second conduit to draw the volume into the pipette.

4. The apparatus for use as a solid-state liquid sampling device of claim 1 wherein each conduit comprises a length of flexible tubing.

5. The apparatus for use as a solid-state liquid sampling device of claim 1 wherein each conduit comprises a path etched into a planar substrate of the electroosmotic pump.

6. The apparatus for use as a solid-state liquid sampling device of claim 1 further comprising a control circuit electrically connected to the electroosmotic pump for providing a control signal for controlling operation of the pump.

7. The apparatus for use as a solid-state liquid sampling device of claim 2 wherein the fluid sensor integrated with the electroosmotic pump is an optical sensor.

8. The apparatus for use as a solid-state liquid sampling device of claim 2 wherein the fluid sensor is an array of sensors positioned in proximity to the second conduit.

9. The apparatus for use as a solid-state liquid sampling device of claim 2 wherein the fluid sensor is a continuous, single sensor covering a sensing range.

10. The apparatus for use as a solid-state liquid sampling device of claim 2 wherein the fluid sensor integrated with the electroosmotic pump is an electrical sensor.

11. The apparatus for use as a solid-state liquid sampling device of claim 10 wherein the electrical sensor is a capacitive sensor.

12. The apparatus for use as a solid-state liquid sampling device of claim 1 wherein the electroosmotic pump comprises a planar structure formed by etching a shallow channel in a substrate.

13. The apparatus for use as a solid-state liquid sampling device of claim 12 wherein the electroosmotic pump further comprises an insulating layer coated on the planar structure.

14. The apparatus for use as a solid-state liquid sampling device of claim 12 wherein the electroosmotic pump further comprises another layer bonded to the planar structure to seal the etched channel.

15. The apparatus for use as a solid-state liquid sampling device of claim 12 wherein the planar structure is formed from a glass substrate.

16. The apparatus for use as a solid-state liquid sampling device of claim 12 wherein the planar structure is formed from a silicon substrate.

17. The apparatus for use as a solid-state liquid sampling device of claim 1 wherein the electroosmotic pump comprises:

a fluid chamber having a fluid inlet and a fluid outlet;
an anode disposed within an anode portion of the chamber;
a cathode disposed within a cathode portion of the chamber; and
a porous structure that provides electroosmotic pumping upon application of the voltage between the anode and the cathode, the porous structure creating a partition in the fluid chamber between the anode portion and the cathode portion.

18. The apparatus for use as a solid-state liquid sampling device of claim 17 wherein the electroosmotic pump further comprises a catalytic recombiner integrated with the fluid chamber.

19. The apparatus for use as a solid-state liquid sampling device of claim 18 wherein the catalytic recombiner recombines oxygen and hydrogen.

20. The apparatus for use as a solid-state liquid sampling device of claim 18 further comprising a heating element disposed in proximity to the catalytic recombiner.

21. The apparatus for use as a solid-state liquid sampling device of claim 17 wherein the electroosmotic pump further comprises:
a channel disposed in the fluid chamber between the cathode portion and the anode portion; and
a gas permeable membrane disposed in proximity to the channel that minimizes a passage of the fluid and allows the passage of hydrogen through the membrane.

22. The apparatus for use as a solid-state liquid sampling device of claim 21 further comprising a catalytic recombiner and another gas permeable membrane that covers the catalytic recombiner to keep it dry.

23. The apparatus for use as a solid-state liquid sampling device of claim 17 wherein the electroosmotic pump further comprises:
a channel disposed in the chamber between the cathode portion and the anode portion; and
a gas permeable membrane disposed in proximity to the channel that minimizes a passage of the fluid and allows the passage of a gas byproduct through the membrane.

24. The apparatus for use as a solid-state liquid sampling device of claim 23 wherein the gas byproduct is hydrogen and the channel allows the hydrogen disposed in the cathode portion to pass to the anode portion.

25. The apparatus for use as a solid-state liquid sampling device of claim 17 wherein the electroosmotic pump further comprises a catalytic recombiner.

26. The apparatus for use as a solid-state liquid sampling device of claim 25 wherein the catalytic recombiner recombines oxygen and hydrogen.

27. The apparatus for use as a solid-state liquid sampling device of claim 17 wherein the poruos structure comprises porous materials.

28. The apparatus for use as a solid-state liquid sampling device of claim 17 wherein the porous structure comprises glass materials.

29. The apparatus for use as a solid-state liquid sampling device of claim 1 wherein the electroosmotic pump comprises:
a fluid chamber having a fluid inlet and a fluid outlet;
an anode disposed within an anode portion of the chamber;
a plurality of cathodes disposed within respective cathode portions of the chamber; and
a plurality of porous structures that provide electroosmotic pumping upon application of the voltage between the anode and the plurality of cathodes, each of the porous structures creating a partition in the fluid chamber between the anode portion and the respective cathode portions.

30. The apparatus for use as a solid-state liquid sampling device of claim 29 wherein the electroosmotic pump further comprises:
a plurality of channels disposed in the chamber between each cathode portion and the anode portion; and
a gas permeable membrane disposed in proximity to the channels that minimizes a passage of the fluid and allows the passage of a gas byproduct through the membrane.

31. The apparatus for use as a solid-state liquid sampling device of claim 30 wherein the gas byproduct is hydrogen and the channels allow the hydrogen disposed in the cathode portions to pass to the anode portion.

32. The apparatus for use as a solid-state liquid sampling device of claim 30 wherein the electroosmotic pump further comprises:
a first channel disposed between a first cathode portion and the anode portion;
a first gas permeable membrane disposed in proximity to the first channel that minimizes a passage of the fluid and allows the passage of a gas byproduct;
a second channel disposed between a second cathode portion and the anode portion; and
a second gas permeable membrane disposed in proximity to the second channel that minimizes a passage of the fluid and allows the passage of the gas byproduct.

33. The apparatus for use as a solid-state liquid sampling device of claim 30 further comprising a catalytic recombiner.

34. The apparatus for use as a solid-state liquid sampling device of claim 33 further comprising a heating element disposed in proximity to the catalytic recombiner.

35. The apparatus for use as a solid-state liquid sampling device of claim 33 further comprising another gas permeable membrane that covers the catalytic recombiner to keep it dry.

36. An apparatus for use as a solid-state liquid sampling device, comprising:
a robotic pipetting arm for carrying a plurality of pipettes;
a plurality of liquid channels with each channel supplying a liquid sample to an associated pipette;
a device for receiving liquid samples dispensed from each of the pipettes that are positioned by the robotic pipetting arm;
a pair of conduits for conveying a working fluid; and
an electroosmotic pump disposed between the pair of conduits for pumping the working fluid through the pump upon the application of a voltage in order to draw a volume of the liquid sample into each pipette.

37. The apparatus for use as a solid-state liquid sampling device of claim 36 wherein the device for receiving liquid samples is a sample plate containing a plurality of wells.

38. The apparatus for use as a solid-state liquid sampling device of claim 36 wherein the device for receiving liquid samples is at least one of a vial, a plate, a glass slide, a membrane, and a substrate.

39. The apparatus for use as a solid-state liquid sampling device of claim 36 wherein the device for receiving liquid samples is a genetic microarray.

40. The apparatus for use as a solid-state liquid sampling device of claim 36 wherein the device for receiving liquid samples is a proteomic microarray.

41. The apparatus for use as a solid-state liquid sampling device of claim 36 wherein the device for receiving liquid samples is a small molecule microarray.

42. The apparatus for use as a solid-state liquid sampling device of claim 36 further comprising a fluid sensor integrated with the electroosmotic pump for detecting a position of the working fluid in the conduits, wherein the position of the working fluid provides an indication of the volume drawn into each pipette.

43. The apparatus for use as a solid-state liquid sampling device of claim 36 wherein the voltage is applied for a predetermined period of time to pump the working fluid to a point in the conduits to draw the volume into the pipette.

44. The apparatus for use as a solid-state liquid sampling device of claim 36 further comprising a plurality of electroosmotic pumps wherein each electroosmotic pump is disposed between a corresponding pair of conduits.

45. The apparatus for use as a solid-state liquid sampling device of claim 36 wherein each conduit comprises a length of flexible tubing.

46. The apparatus for use as a solid-state liquid sampling device of claim 36 wherein each liquid channel conveys a liquid sample from a liquid sample source through a length of flexible tubing to a pipette.

47. The apparatus for use as a solid-state liquid sampling device of claim 36 further comprising a control circuit electrically connected to the electroosmotic pump for providing a control signal for controlling operation of the pump.

48. The apparatus for use as a solid-state liquid sampling device of claim 36 wherein the fluid sensor integrated with the electroosmotic pump is an optical sensor.

49. The apparatus for use as a solid-state liquid sampling device of claim 36 wherein the fluid sensor integrated with the electroosmotic pump is an electrical sensor.

50. The apparatus for use as a solid-state liquid sampling device of claim 36 wherein the electrical sensor is a capacitive sensor.

51. The apparatus for use as a solid-state liquid sampling device of claim 36 wherein the fluid sensor is an array of sensors positioned in proximity to the second conduit.

52. The apparatus for use as a solid-state liquid sampling device of claim 36 wherein the fluid sensor is a continuous, single sensor covering a sensing range.

53. The apparatus for use as a solid-state liquid sampling device of claim 36 further comprising a valve positioned between the liquid channels and the electroosmotic pump for providing a gap between the liquid in the channels and the working fluid in the conduits.

54. The apparatus for use as a solid-state liquid sampling device of claim 53 wherein the valve is a multi-port air valve.

55. The apparatus for use as a solid-state liquid sampling device of claim 53 wherein the valve is a multi-port fluid valve.

56. The apparatus for use as a solid-state liquid sampling device of claim 36 wherein each conduit comprises a path etched into a planar substrate of the electroosmotic pump.

57. The apparatus for use as a solid-state liquid sampling device of claim 56 wherein the path of at least one conduit is a nonlinear path etched through the planar substrate.

58. The apparatus for use as a solid-state liquid sampling device of claim 36 wherein the electroosmotic pump comprises:

a fluid chamber having a fluid inlet and a fluid outlet;

an anode disposed within an anode portion of the chamber;

a cathode disposed within a cathode portion of the chamber; and a porous structure that provides electroosmotic pumping upon application of the voltage between the anode and the cathode, the porous structure creating a partition in the fluid chamber between the anode portion and the cathode portion.

59. The apparatus for use as a solid-state liquid sampling device of claim 58 wherein the porous structure comprises porous oxide materials.

60. The apparatus for use as a solid-state liquid sampling device of claim 58 wherein the porous structure comprises glass materials.

61. The apparatus for use as a solid-state liquid sampling device of claim 36 wherein the electroosmotic pump comprises a planar structure formed by etching a shallow channel in a substrate.

62. The apparatus for use as a solid-state liquid sampling device of claim 61 wherein the planar structure is formed from a glass substrate.

63. The apparatus for use as a solid-state liquid sampling device of claim 61 wherein the planar structure is formed from a silicon substrate.

64. The apparatus for use as a solid-state liquid sampling device of claim 61 wherein the electroosmotic pump further comprises an insulating layer coated on the planar structure.

65. The apparatus for use as a solid-state liquid sampling device of claim 64 wherein the electroosmotic pump further comprises another layer bonded to the planar structure to seal the etched channel.

* * * * *